United States Patent
Tsuji

(10) Patent No.: US 12,267,768 B2
(45) Date of Patent: *Apr. 1, 2025

(54) TERMINAL DEVICE AND NON-TRANSITORY COMPUTER-READABLE MEDIUM STORING COMPUTER-READABLE INSTRUCTIONS FOR TERMINAL DEVICE

(71) Applicant: BROTHER KOGYO KABUSHIKI KAISHA, Nagoya (JP)

(72) Inventor: Ryoya Tsuji, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/215,250

(22) Filed: Jun. 28, 2023

(65) Prior Publication Data

US 2025/0008419 A1 Jan. 2, 2025

Related U.S. Application Data

(63) Continuation of application No. 16/717,437, filed on Dec. 17, 2019, now Pat. No. 11,736,274.

(30) Foreign Application Priority Data

Jan. 9, 2019 (JP) .................................. 2019-002066

(51) Int. Cl.
*H04W 48/16* (2009.01)
*H04W 12/04* (2021.01)
(Continued)

(52) U.S. Cl.
CPC ........... *H04W 48/16* (2013.01); *H04W 12/04* (2013.01); *H04W 12/06* (2013.01); *H04W 84/12* (2013.01)

(58) Field of Classification Search
CPC ............... H04L 9/0825; H04N 1/4413; H04W 12/04; H04W 12/06; H04W 12/08; H04W 48/16;
(Continued)

(56) References Cited

U.S. PATENT DOCUMENTS 7,467,302 B2 12/2008 Kao et al.
8,693,038 B2 4/2014 Suzuki
(Continued)

FOREIGN PATENT DOCUMENTS

CN 101945371 A 1/2011
CN 102696204 A 9/2012
(Continued)

OTHER PUBLICATIONS

Official Action dated Nov. 22, 2022 received from the Japanese Patent Office in related JP 2019-002066 together with English language translation.
(Continued)

*Primary Examiner* — Shahriar Zarrineh
(74) *Attorney, Agent, or Firm* — Scully, Scott, Murphy & Presser, P.C.

(57) ABSTRACT

A terminal device may, in a case where a first type of related information including a public key is obtained due to a first type of communication device outputting the first type of related information, send first connection information to the first type of communication device. The first type of communication device may be capable of executing a wireless communication complying with a predetermined rule of Wi-Fi scheme. The terminal device may, in a case where a second type of related information different from the first type of related information is obtained due to a second type of communication device outputting the second type of related information, send second connection information to the second type of communication device. The second type
(Continued)

of communication device may be incapable of executing a wireless communication complying with the predetermined rule.

11 Claims, 12 Drawing Sheets

(51) Int. Cl.
*H04W 12/06* (2021.01)
*H04W 84/12* (2009.01)

(58) Field of Classification Search
CPC ............... H04W 88/08; H04W 12/069; H04W 12/73; H04W 12/77; H04W 12/50; H04W 48/20; H04W 84/12
See application file for complete search history.

(56) References Cited

U.S. PATENT DOCUMENTS

| | | | |
|---|---|---|---|
| 8,938,214 B2 | 1/2015 | Shibata | |
| 10,051,676 B2 | 8/2018 | Qi et al. | |
| 10,169,587 B1 | 1/2019 | Nix | |
| 11,284,258 B1 | 3/2022 | Wei et al. | |
| 2008/0240068 A1 | 10/2008 | Ishimoto | |
| 2010/0082978 A1* | 4/2010 | Suzuki | H04L 63/083 713/168 |
| 2011/0228330 A1 | 9/2011 | Nogawa | |
| 2012/0322391 A1 | 12/2012 | Suzuki | |
| 2013/0027741 A1* | 1/2013 | Liu | G06F 3/1204 358/1.15 |
| 2015/0092601 A1 | 4/2015 | Ando | |
| 2015/0245393 A1* | 8/2015 | Lee | H04W 72/51 370/338 |
| 2015/0289295 A1 | 10/2015 | Granbery | |
| 2016/0007200 A1* | 1/2016 | Shibata | H04L 63/205 713/168 |
| 2016/0128113 A1 | 5/2016 | Qi et al. | |
| 2016/0179457 A1 | 6/2016 | Ikeda et al. | |
| 2016/0286344 A1 | 9/2016 | Terashita | |
| 2016/0360407 A1 | 12/2016 | Benoit et al. | |
| 2017/0041400 A1 | 2/2017 | Asakura | |
| 2017/0041966 A1 | 2/2017 | Asakura | |
| 2017/0070951 A1 | 3/2017 | Takeuchi | |
| 2017/0127379 A1* | 5/2017 | Mayuzumi | G01S 3/801 |
| 2017/0127384 A1 | 5/2017 | Shimada | |
| 2017/0005876 A1 | 6/2017 | Shibata | |
| 2017/0156172 A1 | 6/2017 | Yokoyama et al. | |
| 2017/0180342 A1* | 6/2017 | Hamachi | H04W 76/11 |
| 2017/0202035 A1* | 7/2017 | Yokoyama | H04N 1/00315 |
| 2017/0215067 A1 | 7/2017 | Goto | |
| 2017/0257819 A1 | 9/2017 | McCann et al. | |
| 2017/0289742 A1 | 10/2017 | Asakura | |
| 2017/0295448 A1 | 10/2017 | McCann | |
| 2017/0353981 A1* | 12/2017 | Lee | H04W 12/08 |
| 2018/0048785 A1 | 2/2018 | Shibata | |
| 2018/0069718 A1* | 3/2018 | Terao | H04L 12/28 |
| 2018/0077255 A1 | 3/2018 | Goto | |
| 2018/0098217 A1 | 4/2018 | Takeuchi et al. | |
| 2018/0124274 A1 | 5/2018 | Terashita et al. | |
| 2018/0124860 A1 | 5/2018 | Moritomo | |
| 2018/0152973 A1 | 5/2018 | Ueno et al. | |
| 2018/0184296 A1 | 6/2018 | Hunt | |
| 2018/0199205 A1 | 7/2018 | Zhu et al. | |
| 2018/0213405 A1* | 7/2018 | Jung | H04W 12/069 |
| 2018/0213578 A1 | 7/2018 | Tachibana | |
| 2018/0225069 A1* | 8/2018 | Hosoda | H04N 1/00307 |
| 2018/0239572 A1 | 8/2018 | Suzuki et al. | |
| 2018/0241847 A1 | 8/2018 | Shimada et al. | |
| 2018/0242378 A1 | 8/2018 | Suzuki et al. | |
| 2018/0248697 A1* | 8/2018 | Shimada | G06F 3/1204 |
| 2018/0278625 A1 | 9/2018 | Cammarota et al. | |
| 2018/0288820 A1 | 10/2018 | Shibata et al. | |
| 2018/0331828 A1 | 11/2018 | Pakkan et al. | |
| 2018/0375665 A1 | 12/2018 | Contenti et al. | |
| 2019/0089686 A1* | 3/2019 | Jung | H04W 76/14 |
| 2019/0215878 A1 | 7/2019 | Goto | |
| 2019/0320317 A1 | 10/2019 | Sakai | |
| 2020/0104081 A1 | 4/2020 | Miyake | |
| 2020/0221296 A1 | 7/2020 | Jiang et al. | |
| 2020/0228974 A1 | 7/2020 | Miyake | |
| 2021/0385778 A1* | 12/2021 | Ahn | H04W 48/08 |
| 2022/0015161 A1 | 1/2022 | Goto | |

FOREIGN PATENT DOCUMENTS

| | | | | |
|---|---|---|---|---|
| CN | 103416039 A | | 11/2013 | |
| CN | 105446305 A | | 3/2016 | |
| CN | 106060303 A | | 10/2016 | |
| CN | 103582155 A | | 5/2017 | |
| CN | 103582155 B | * | 5/2017 | ........ H04W 12/0013 |
| CN | 109068327 A | * | 12/2018 | |
| CN | 109426469 A | | 3/2019 | |
| CN | 109863770 A | | 6/2019 | |
| CN | 110115099 A | | 8/2019 | |
| CN | 112425030 A | * | 2/2021 | ............. H02J 50/12 |
| CN | 108012264 B | * | 6/2021 | ......... H04L 63/0407 |
| CN | 110301143 B | | 4/2022 | |
| EP | 2536190 A1 | | 12/2012 | |
| EP | 2945346 A1 | * | 11/2015 | ............ H04W 12/06 |
| EP | 3316604 A1 | * | 5/2018 | ........... H04B 5/0025 |
| EP | 3462806 A1 | | 4/2019 | |
| EP | 4124090 A1 | * | 1/2023 | ............. H04L 63/18 |
| JP | 2006345150 A | | 12/2006 | |
| JP | 2013074579 A | | 4/2013 | |
| JP | 2016-213573 A | | 12/2016 | |
| JP | 2017-028460 A | | 2/2017 | |
| JP | 2017050612 A | | 3/2017 | |
| JP | 2018-006983 A | | 1/2018 | |
| JP | 2018-042058 A | | 3/2018 | |
| JP | 2018-142923 A | | 9/2018 | |
| JP | 2019180039 A | | 10/2019 | |
| JP | 2019193120 A | | 10/2019 | |
| JP | 2019220890 A | | 12/2019 | |
| JP | 2020036125 A | * | 3/2020 | |
| JP | 2020039060 A | * | 3/2020 | ........... G06F 3/1204 |
| JP | 2020043474 A | | 3/2020 | |
| JP | 2020044663 A | | 3/2020 | |
| JP | 2020088428 A | * | 6/2020 | ........... G06F 3/1204 |
| TW | 201503655 A | | 1/2015 | |
| TW | 202046818 A | * | 12/2020 | ........... H04W 12/009 |
| WO | WO-2016056250 A1 | * | 4/2016 | ........... H04B 10/114 |
| WO | WO-2016148548 A1 | * | 9/2016 | ........... H04W 12/003 |
| WO | WO-2016174821 A1 | * | 11/2016 | ............ H04W 12/08 |
| WO | WO-2017013854 A1 | * | 1/2017 | ......... G06K 7/10722 |
| WO | 2018127797 A1 | | 9/2018 | |
| WO | 2019177231 A1 | | 9/2019 | |
| WO | 2019194391 A1 | | 10/2019 | |
| WO | 2020013412 A1 | | 1/2020 | |

OTHER PUBLICATIONS

Draft Device Provisioning Protocol Technical Specification Version 0.2.11, draft of a standard prepared by the Wi-Fi Alliance, cited in spec on p. 3.
"Wi-Fi Peer-to-Peer (P2P) Technical Specification Version 1.1" created by the Wi-Fi Alliance Technical Committee P2P Task Group, cited in spec on p. 3.
Office Action dated Apr. 22, 2022 from parent application U.S. Appl. No. 16/717,437.
Office Action dated Nov. 7, 2022 from parent application U.S. Appl. No. 16/717,437.
Notice of Allowance dated Mar. 30, 2023 from parent application U.S. Appl. No. 16/717,437.

* cited by examiner

TERMINAL DEVICE AND NON-TRANSITORY COMPUTER-READABLE MEDIUM STORING COMPUTER-READABLE INSTRUCTIONS FOR TERMINAL DEVICE

CROSS-REFERENCE TO RELATED APPLICATION

This application is a continuation application of U.S. Ser. No. 16/717,437 filed on Dec. 17, 2019 and claims priority to Japanese Patent Application No. 2019-002066 filed on Jan. 9, 2019, the contents of which are hereby incorporated by reference into the present application.

TECHNICAL FIELD

The present teachings disclose a technique related to a terminal device capable of establishing wireless connection between a communication device and an external device.

DESCRIPTION OF RELATED ART

DPP (Device Provisioning Protocol) scheme, which is a wireless communication scheme established by the Wi-Fi Alliance, is known. The DPP scheme is a wireless communication scheme for easily establishing a Wi-Fi connection. For example, a terminal device executes a communication complying with the DPP scheme to send, to a client device, information for establishing a Wi-Fi connection with an access point. As a result, a Wi-Fi connection is established between the client device and the access point.

SUMMARY

The present teachings disclose a technique capable of establishing wireless connection between a communication device and an external device irrespective of whether the communication device is a device capable of executing wireless communication complying with a predetermined rule of a Wi-Fi scheme, or is a device incapable of executing the wireless communication complying the predetermined rule.

A non-transitory computer-readable medium storing computer-readable instructions for a terminal device is disclosed herein. The computer-readable instructions, when executed by a processor of the terminal device, may cause the terminal device to: in a case where a communication device outputs related information which is related to a wireless connection, obtain the related information; in a case where the communication device is a first type of communication device and the obtained related information is a first type of related information including a public key of the first type of communication device, send first connection information to the first type of communication device by using the first type of related information, the first type of communication device being capable of executing a wireless communication complying with a predetermined rule of Wi-Fi scheme, and the first connection information being for establishing a first type of wireless connection complying with the predetermined rule between the first type of communication device and a first external device different from the first type of communication device; and in a case where the communication device is a second type of communication device and the obtained related information is a second type of related information being different from the first type of related information, send second connection information to the second type of communication device by using the second type of related information, the second type of communication device being incapable of executing a wireless communication complying with the predetermined rule, and the second connection information being for establishing a second type of wireless connection not complying with the predetermined rule between the second type of communication device and a second external device different from the second type of communication device.

The above computer program is also novel and useful. The above terminal device itself and a method implemented by the terminal device are also novel and useful.

EMBODIMENTS

Figure 1:
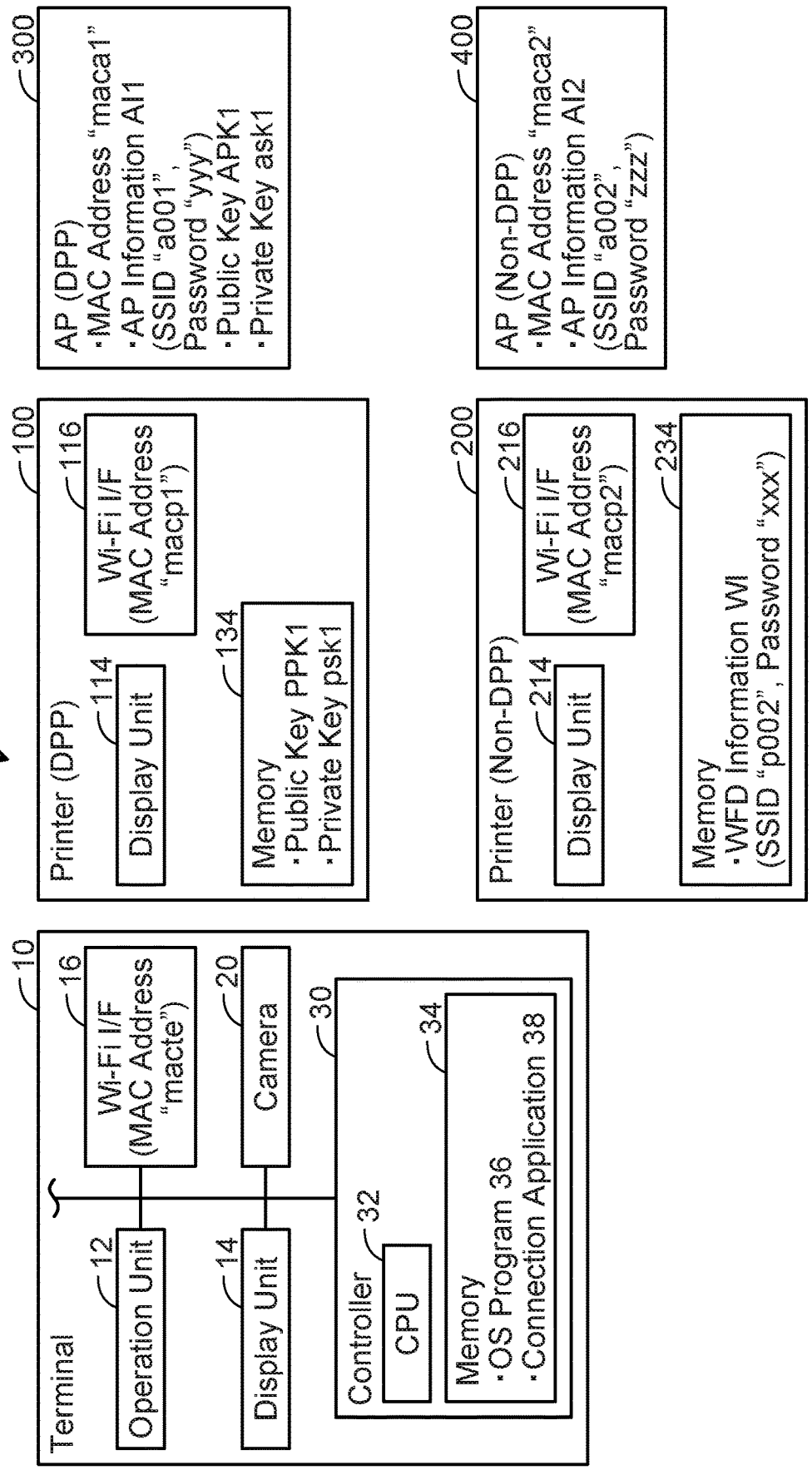
FIG. 1 shows a configuration of a communication system.

First Embodiment (Configuration of Communication System 2; FIG. 1)
As shown in FIG. 1, a communication system 2 comprises a terminal 10, printers 100, 200, and APs (Access Point) 300, 400. In this embodiment, a situation is assumed in which a user uses a terminal (e.g., the terminal 10) to establish wireless connection complying with the Wi-Fi scheme between a printer (e.g., the printer 100) and an AP (e.g., the AP 300).

(Configuration of Terminal 10)
The terminal 10 is a portable terminal device such as a cellphone (e.g., a smartphone), a PDA, and a tablet PC. In a variant, the terminal 10 may be a desktop PC, a laptop PC or the like.

The terminal 10 comprises an operation unit 12, a display unit 14, a Wi-Fi interface 16, a camera 20, and a controller 30. The respective units 12 to 30 are connected to a bus line (reference number omitted). Hereinbelow, an interface will be simply termed "I/F".

The operation unit 12 comprises a plurality of keys. The user can input various instructions to the terminal 10 by operating the operation unit 12. The display unit 14 is a display for displaying various types of information. The display unit 14 also functions as a touch panel (i.e., operation unit) which receives instructions from the user. The camera 20 is a device for capturing images of an object, and in this embodiment, it is especially used to capture QR codes (registered trademark) for a printer and an AP.

A MAC address "macte" is assigned in the Wi-Fi I/F 16. The Wi-Fi I/F 16 is a wireless interface configured to execute wireless communication complying with a Wi-Fi scheme (hereinbelow termed "Wi-Fi communication"). The Wi-Fi scheme is, for example, a wireless communication scheme for executing wireless communication according to 802.11 standard of IEEE (the Institute of Electrical and Electronics Engineers, Inc.) and standards complying thereto (such as 802.11a, 11b, 11g, 11n, 11ac, etc.). The Wi-Fi I/F 16 especially supports a WFD (Wi-Fi Direct (registered trademark)) scheme established by the Wi-Fi Alliance. That is, the terminal 10 is a WFD device. The WFD scheme is a wireless communication scheme described in the standard "Wi-Fi Peer-to-Peer (P2P) Technical Specification Version 1.1" created by the Wi-Fi Alliance.

The terminal 10 can operate in any state of G/O (Group Owner) state, CL (Client) state, and device state of the WFD scheme. For example, the terminal 10 can operate as a client of the WFD scheme, and participate as a child station in a Wi-Fi network formed by a printer (e.g., the printer 200) operating as a G/O of the WFD scheme.

Further, the Wi-Fi I/F 16 supports Device Provisioning Protocol (DPP) scheme that is to be established by the Wi-Fi Alliance. The DPP scheme is described in a draft standard "Device Provisioning Protocol Technical Specification Version 0.2.11" created by the Wi-Fi Alliance, and is a wireless communication scheme for easily establishing wireless connection between a pair of devices (such as the printer 100 and the AP 300) by using the terminal 10.

The controller 30 comprises a CPU 32 and a memory 34. The CPU 32 executes various processes in accordance with programs 36, 38 stored in the memory 34. The memory 34 is constituted of a volatile memory, a non-volatile memory and the like, and stores the Operating System (OS) program 36 and the connection application 38 (hereinbelow simply termed "app 38").

The OS program 36 is a program for controlling basic operations of the terminal 10. The app 38 is a program for establishing wireless connection complying with the Wi-Fi scheme between a pair of devices. The app 38 is installed in the terminal 10, for example, from a server on the Internet provided by a vendor of the printer 100.

(Configuration of Printer 100)

The printer 100 is a peripheral device (e.g., a peripheral device of the terminal 10) capable of executing a print function. The printer 100 comprises a display unit 114, a Wi-Fi I/F 116, and a memory 134.

The display unit 114 is a display for displaying various information. The Wi-Fi I/F 116 is similar to the Wi-Fi I/F 16 of the terminal 10. That is, the Wi-Fi I/F 116 supports the WFD scheme and the DPP scheme. Further, the Wi-Fi I/F 116 has a MAC address "macp1".

The memory 134 stores a public key PPK1 and a private key psk1 to be used in processes complying with the DPP scheme, to be described later. The public key PPK1 and the private key psk1 are stored in advance in the memory 134 from a shipment stage of the printer 100. The printer 100 can display a QR code obtained by encoding DPP information including the public key PPK1 and the MAC address "macp1". In a variant, the public key PPK1 and the private key psk1 may be created by the printer 100 at time of turning on power of the printer 100, and be stored in the memory 134.

(Configuration of Printer 100)

The printer 200 comprises a display unit 214, a Wi-Fi I/F 216, and a memory 234. The display unit 214 is similar to the display unit 114 of the printer 100.

The Wi-Fi I/F 216 is similar to the Wi-Fi I/F 116 of the printer 100 except for a point that the Wi-Fi I/F 216 does not support the DPP scheme. Further, the Wi-Fi I/F 216 has a MAC address "macp2". Hereinbelow, a device not supporting the DPP scheme may be termed "non-DPP device" and a device supporting the DPP scheme may be termed "DPP device".

The memory 234 stores WFD information WI to be used in processes complying with the WFD scheme, to be described later. The WFD information WI includes an SSID (Service Set Identifier) "p002" for identifying a Wi-Fi network complying with the WFD scheme, and a password "xxx" to be used in the Wi-Fi network. The printer 100 can display a QR code obtained by encoding the WFD information WI.

(Configuration of AP 300)

The AP 300 is an AP supporting the DPP scheme. A MAC address "maca1" is assigned in the AP 300. Further, AP information AI1, a public key APK1, and a private key ask1 are stored in advance from a shipment stage in the AP 300. The AP information AI1 includes an SSID "a001" for identifying the Wi-Fi network formed by the AP 300, and a password "yyy" to be used in the Wi-Fi network. The public key APK1 and the private key ask1 are information to be used in processes complying with the DPP scheme, to be described later. A QR code obtained by encoding DPP information including the public key APK1 and the MAC address "maca1" is adhered to a housing of the AP 300.

(Configuration of AP 400)

The AP 400 is an AP not supporting the DPP scheme. A MAC address "maca2" is assigned in the AP 400. Further, AP information AI2 is stored in advance from a shipment stage in the AP 400. The AP information AI2 includes an SSID "a002" for identifying the Wi-Fi network formed by the AP 400, and a password "zzz" to be used in the Wi-Fi network.

Figure 2:
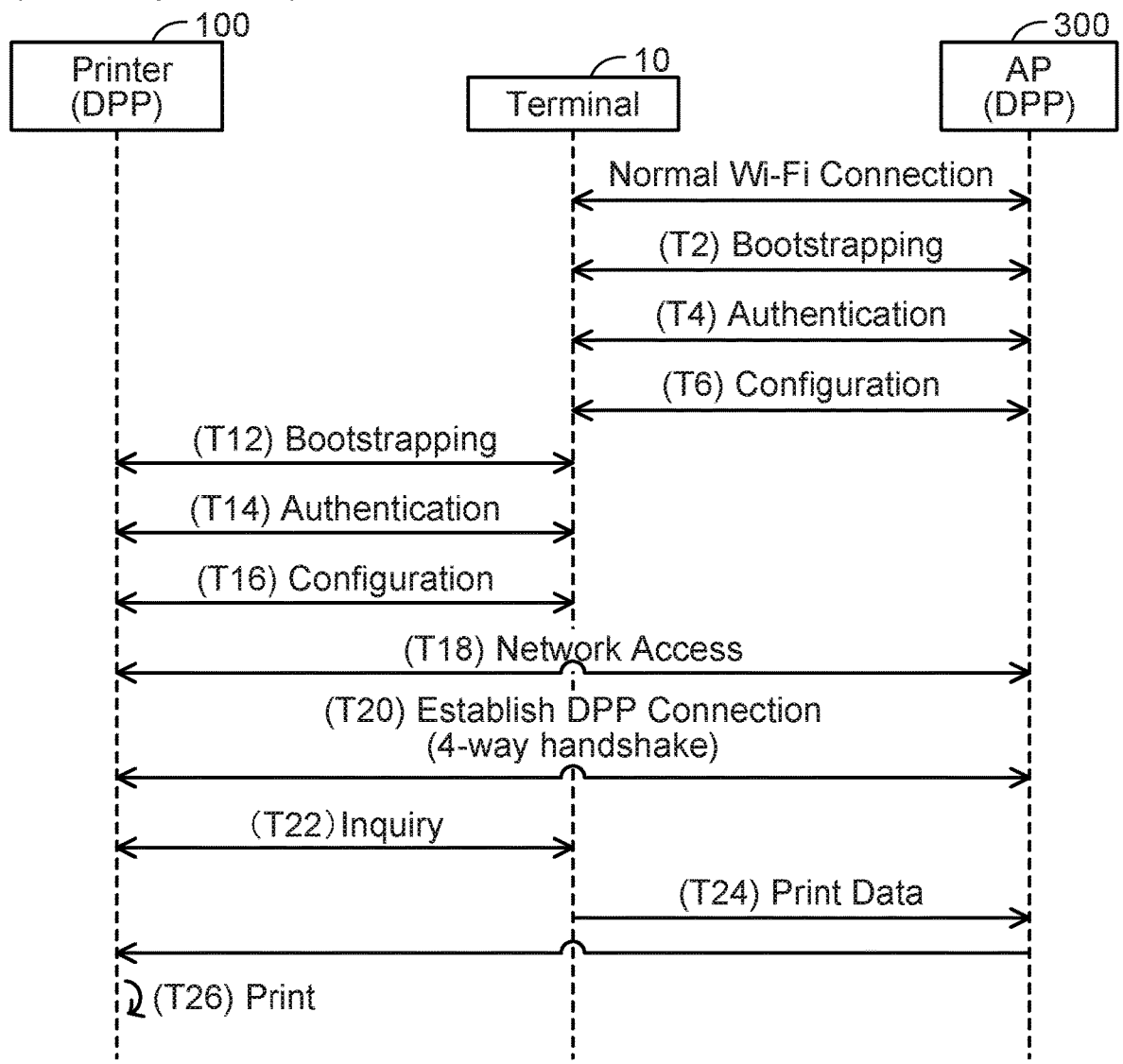
FIG. 2 shows an explanatory diagram for explaining an overview of DPP.

(Overview of DPP; FIG. 2)

Next, an overview of a process for establishing wireless connection complying with the Wi-Fi scheme between a printer and an AP according to the DPP scheme will be described with reference to FIG. 2. In this embodiment, the devices 10, 100, 300 realize the establishment of the wireless connection complying with the Wi-Fi scheme between the printer 100 and the AP 300 by executing communication according to the DPP scheme. Hereinbelow, to facilitate understanding, operations which CPUs (such as the CPU 32) of the respective devices execute will be described with the devices (such as the terminal 10) as subjects of action instead of describing the operations with the CPUs as the subjects of action.

In an initial state of FIG. 2, the user operates the terminal 10 to input the AP information AI1 of the AP 300 (i.e., the SSID "a001" and the password "yyy") to the terminal 10. Thereby, the terminal 10 and the AP 300 execute communication of 4 way-handshake for establishing a Wi-Fi connection. During at least a part of the communication of 4 way-handshake, the terminal 10 sends encrypted information, which is encrypted using a key created from the SSID "a001" and the password "yyy", to the AP 300. Then, in a case where the encrypted information is successfully decrypted, wireless connection complying with the Wi-Fi scheme is established between the terminal 10 and the AP 300. Hereinbelow, wireless connection established using AP information is termed "normal Wi-Fi connection".

In T2, the terminal 10 executes Bootstrapping (hereinbelow simply termed "BS") according to the DPP scheme with the AP 300. This BS is a process of providing, from the AP 300 to the terminal 10, information that is to be used in Authentication (hereinbelow simply termed "Auth") of T4 to be described later in response to the QR code adhered to the AP 300 being captured by the terminal 10.

In T4, the terminal 10 executes Auth according to the DPP scheme with the AP 300 by using the information obtained in the BS of T2. This Auth is a process for the terminal 10 and the AP 300 to authenticate their communication counterparts.

In T6, the terminal 10 executes Configuration (hereinbelow simply termed "Config") according to the DPP scheme with the AP 300. This Config is a process of sending, to the AP 300, information for the AP 300 to establish a Wi-Fi connection. Specifically, the terminal 10 creates a Configuration Object for AP (hereinbelow, Configuration Object will be simply termed "CO"), and sends the CO for AP to the AP 300. As a result, the CO for AP is stored in the AP 300.

Next, in T12, the terminal 10 executes BS according to the DPP scheme with the printer 100. This BS is a process of providing, from the printer 100 to the terminal 10, information that is to be used in Auth of T14 to be described later in response to a QR code displayed in the printer 100 being captured by the terminal 10.

In T14, the terminal 10 executes Auth according to the DPP scheme with the printer 100 by using the information obtained in the BS of T12. This Auth is a process for the terminal 10 and the printer 100 to authenticate their communication counterparts.

In T16, the terminal 10 executes Config according to the DPP scheme with the printer 100. This Config is a process of sending, to the printer 100, information for the printer 100 to establish a Wi-Fi connection. Specifically, the terminal 10 creates a CO for printer and sends it to the printer 100. As a result, the CO for printer is stored in the printer 100.

In T18, the printer 100 and the AP 300 execute Network Access (hereinbelow simply termed "NA") according to the DPP scheme by using the stored CO for AP and the stored CO for printer. This NA is a process for sharing, between the printer 100 and the AP 300, a connection key for establishing a Wi-Fi connection between the printer 100 and the AP 300.

In T20, the printer 100 and the AP 300 execute communication of 4 way-handshake. During at least a part of the communication of 4 way-handshake, the printer 100 and the AP 300 communicate encrypted information encrypted by the connection key shared in the NA of T18. Then, in a case where the encrypted information is successfully decrypted, a Wi-Fi connection is established between the printer 100 and the AP 300. Thereby, the printer 100 can participate, as a child station, in the Wi-Fi network formed by the AP 300, as a result of which the printer 100 can execute communication via the AP 300 with another device (e.g., the terminal 10) participating in the Wi-Fi network. Hereinbelow, the wireless connection established by executing the BS, Auth, Config, and NA described above is termed "DPP connection". In a variant, the printer 100 and the AP 300 may execute communication of SAE (Simultaneous Authentication of Equals, commonly called "Dragonfly") instead of the communication of 4 way-handshake.

In T22, the terminal 10 executes Inquiry according to the DPP scheme. This Inquiry is a process for inquiring of the printer 100 about whether the printer 100 has established a Wi-Fi connection with the AP 300. Specifically, the terminal 10 starts repeatedly sending an Inquiry Request to the printer 100. In a case where the printer 100 receives the Inquiry Request from the terminal 10 before the printer 100 establishes a Wi-Fi connection with the AP 300, the terminal 10 does not receive a response from the printer 100. On the other hand, in a case where the printer 100 receives the Inquiry Request from the terminal 10 after the printer 100 has established the Wi-Fi connection with the AP 300, the terminal 10 receives a response from the printer 100. In a case where the terminal 10 receives a response to the Inquiry Request from the printer 100, the terminal 10 determines that the printer 100 has established a Wi-Fi connection with the AP 300.

In FIG. 2, a normal Wi-Fi connection has already been established between the terminal 10 and the AP 300. For this reason, when the printer 100 participates in the Wi-Fi network formed by the AP 300, both the terminal 10 and the printer 100 achieve a state of participating in the Wi-Fi network. As a result, in T24 the printer 100 can receive print data representing an image of a print target from the terminal 10 via the AP 300. In this case, in T26 the printer 100 executes printing in accordance with the print data.

In the DPP scheme, in order to establish a Wi-Fi connection between the printer 100 and the AP 300, the user does not need to input the AP information AI1 of the AP 300 to the printer 100. Therefore, the user can easily establish the Wi-Fi connection between the printer 100 and the AP 300.

Figure 3:
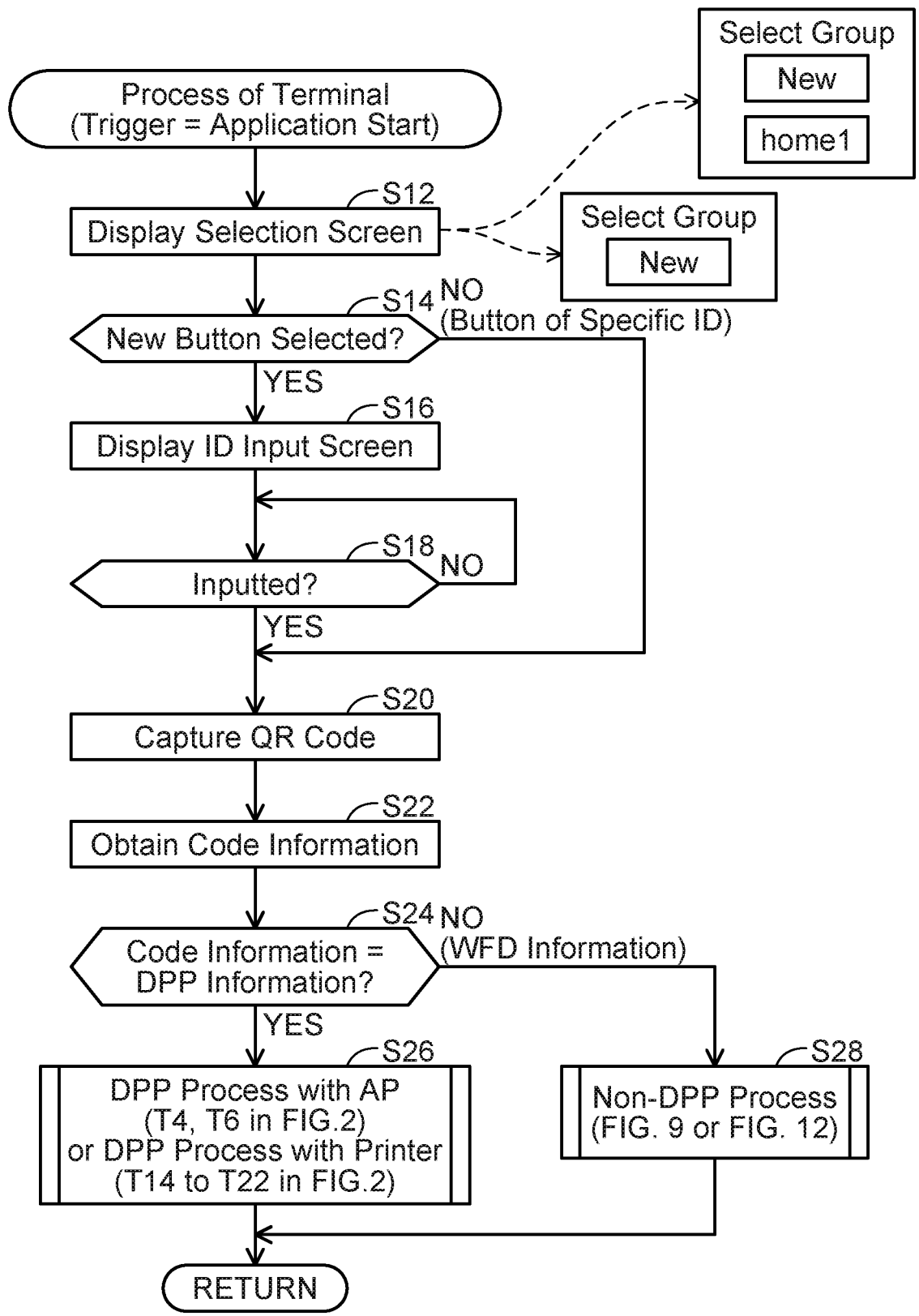
FIG. 3 shows a flowchart of processes of a terminal.

(Process of Terminal 10; FIG. 3)

Next, a process executed by the CPU 32 of the terminal 10 in order to realize the process of FIG. 2 and a non-DPP process, to be described later, will be described with reference to FIG. 3. The process of FIG. 3 begins with starting of the app 38 as a trigger. The process of FIG. 3 is realized by the app 38.

In S12, the CPU 32 displays a selection screen on the display unit 14. The selection screen includes a "New" button indicating that a device (e.g., the printer 100) is to be caused to participate in a new Wi-Fi network. In a case where the "New" button is selected, and a specific group ID (e.g., a group ID "home1") was inputted in the past, the selection screen includes a button (e.g., a "home1" button) showing the specific group ID.

In S14, the CPU 32 determines whether the "New" button in the selection screen has been selected. In a case of determining that the "New" button has been selected in the selection screen (YES in S14), the CPU 32 proceeds to S16. On the other hand, in a case of determining that a button other than the "New" button (e.g., the "home1" button) has been selected in the selection screen (NO in S14), the CPU 32 skips S16, S18, and proceeds to S20.

In S16, the CPU 32 displays an ID input screen for inputting the group ID in the display unit 14. The group ID is information for identifying the wireless network in which the device is to participate.

In S18, the CPU 32 monitors whether a new group ID is input to the ID input screen. In a case where a new group ID is input to the ID input screen (YES in S18), the CPU 32 proceeds to S20.

In S20, the CPU 32 activates the camera 20 and uses the camera 20 to capture a QR code adhered to the housing of the AP 300 or a QR code displayed on a printer (e.g., the printer 100).

In S22, the CPU 32 decodes the captured QR code to obtain coded information encoded by the QR code. In a case where the captured QR code is the QR code of the AP 300, the coded information is DPP information including the public key APK1 of the AP 300 and the MAC address "maca1" of the AP 300. Further, in a case where the captured QR code is the QR code of the printer 100, the coded information is DPP information including the public key PPK1 of the printer 100 and the MAC address "macp1" of the printer 100. Further, in a case where the captured QR code is the QR code of the printer 200, the coded information is the WFD information WI of the printer 200.

In S24, the CPU 32 determines whether the obtained coded information is the DPP information. Specifically, the CPU 32 determines that the obtained coded information is the DPP information in a case where the obtained coded information includes a public key having a format compliant with the DPP scheme while, in another case than that, the CPU 32 determines that the obtained coded information is WFD information. The CPU 32 proceeds to S26 in the case of determining that the obtained coded information is the DPP information (YES in S24), and proceeds to S28 in the case of determining that the obtained coded information is the WFD information (NO in S24).

In S26, the CPU 32 executes the DPP process of T4, T6 of FIG. 2 in a case where the coded information is the DPP information of the AP 300. On the other hand, the CPU 32 executes the DPP process of T14 to T18 of FIG. 2 in a case where the coded information is the DPP information of the printer 100.

In S28, the CPU 32 executes a process of FIG. 9 or FIG. 12 as a non-DPP process, to be described later. When the process of S26 or S28 ends, the CPU 32 returns to S12.

Figure 4:
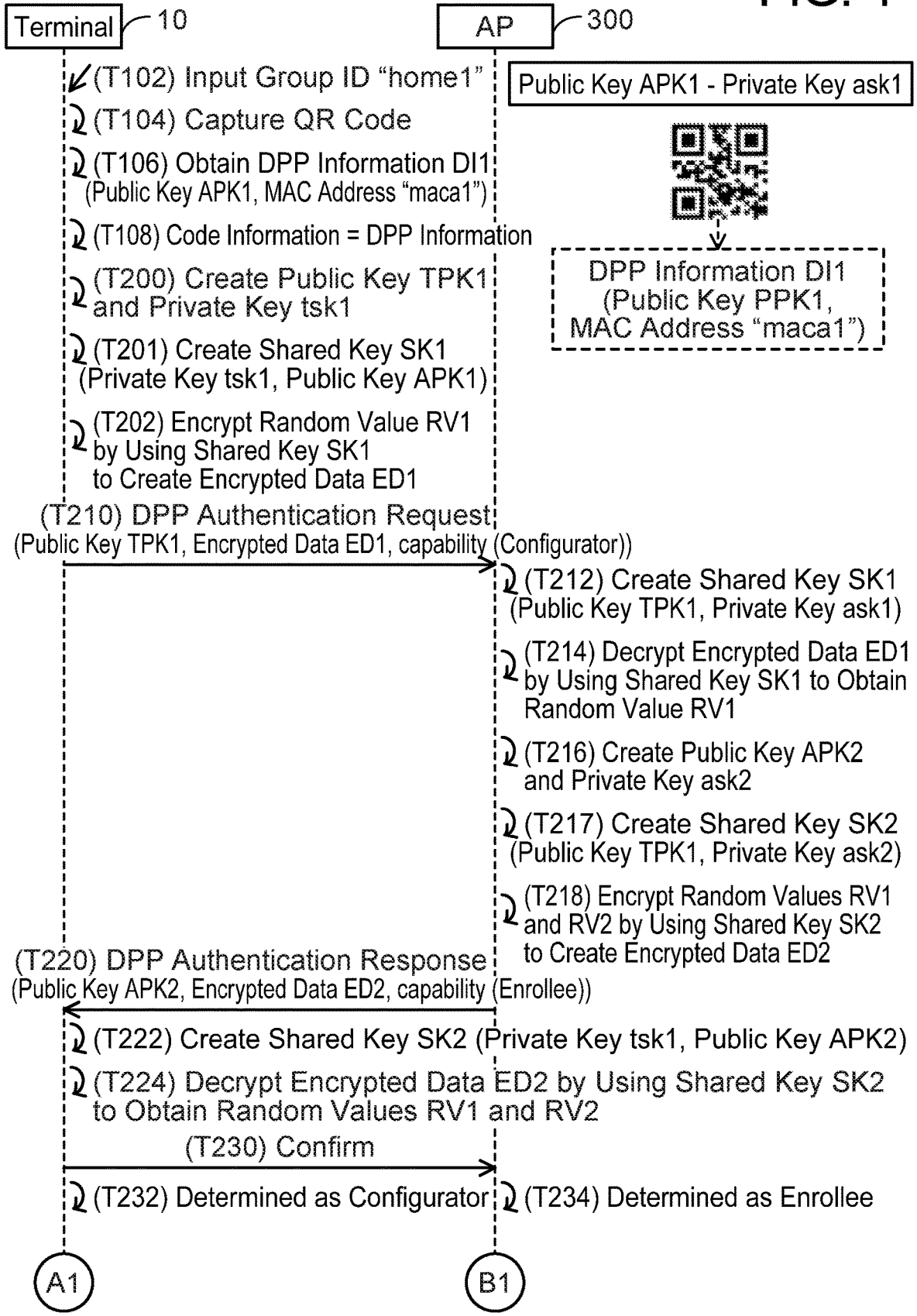
FIG. 4 shows a sequence view of a Bootstrapping process and an Authentication process with an AP.

(Bootstrapping (BS) and Authentication (Auth) With AP; FIG. 4)

Processes executed in T2 to T18 of FIG. 2 will be described in detail with reference to FIG. 4 to FIG. 8. First, a BS process executed between the terminal 10 and the AP 300 in T2 of FIG. 2, and an Auth process executed between the terminal 10 and the AP 300 in T4 will be described with reference to FIG. 4.

T102 to T108 correspond to the BS process, which is realized by the processes of S12 to S24 of FIG. 3. In T102, the terminal 10 starts the app 38, and displays the selection screen on the display unit 14 (S12 of FIG. 3). Then, the "New" button in the selection screen is selected, and the new group ID "home1" is inputted (S18).

In T104, the terminal 10 uses the camera 20 to capture the QR code adhered to the housing of the AP 300 (S20).

In T106, the terminal 10 decodes the captured QR code to obtain DPP information DI1 (i.e., the public key APK1 and the MAC address "maca1") of the AP 300 (S22).

In T108, since the DPP information DI1 is obtained as the coded information, the terminal 10 determines that the obtained coded information is the DPP information (YES in S24), and executes the Auth process by executing the processes of T200 to T234, to be described later.

In T200, the terminal 10 creates a public key TPK1 and a private key tsk1 of the terminal 10. Next, in T201, the terminal 10 creates a shared key SK1 according to ECDH (Elliptic curve Diffie-Hellman key exchange) by using the created private key tsk1 and the public key APK1 of the AP 300 obtained in T106. Then, in T202, the terminal 10 encrypts a random value RV1 by using the created shared key SK1 to create encrypted data ED1.

In T210, the terminal 10 sends a DPP Authentication Request (hereinbelow simply termed "AReq") to the AP 300 via the Wi-Fi I/F 16 with the MAC address "maca1" obtained in T106 as its destination. The AReq is a signal requesting the AP 300 to execute authentication, and includes the public key TPK1 of the terminal 10 created in T200, the encrypted data ED1 created in T202, and a capability of the terminal 10.

The capability is information that is pre-designated in a device supporting the DPP scheme and includes a value which is one of: a value indicating that the device is capable of operating only as a Configurator according to the DPP scheme, a value indicating that the device is capable of operating only as an Enrollee according to the DPP scheme, and a value indicating that the device is capable of operating as both the Configurator and the Enrollee. The Configurator refers to a device configured to send a CO that is to be used in NA (e.g., T18 of FIG. 2) to the Enrollee in Config (e.g., T16 of FIG. 2). On the other hand, the Enrollee refers to a device configured to receive the CO that is to be used in the NA from the Configurator in the Config. As described above, in this embodiment, the terminal 10 creates the CO for AP and the CO for printer and sends them respectively to the AP 300 and the printer 100. As such, the capability of the terminal 10 includes a value indicating that it is capable of operating only as the Configurator.

In T210, the AP 300 receives the AReq from the terminal 10. As described above, this AReq is sent with the MAC address "maca1" of the AP 300 as the destination. Therefore, the AP 300 can appropriately receive this AReq from the terminal 10.

Next, the AP 300 executes the following process for authenticating the sender of the AReq (i.e., the terminal 10). Specifically, in T212, the AP 300 creates a shared key SK1 according to the ECDH by using the public key TPK1 of the terminal 10 in the AReq and the private key ask1 of the AP 300. Here, the shared key SK1 created by the terminal 10 in T201 is the same as the shared key SK1 created by the AP 300 in T212. Therefore, in T214, the AP 300 can appropriately decrypt the encrypted data ED1 in the AReq by using the created shared key SK1, as a result of which the AP 300 can obtain the random value RV1. In a case where the decryption of the encrypted data ED1 succeeds, the AP 300 determines that a sender of the AReq is the device that captured the QR code of the AP 300, that is, determines that the authentication has succeeded, and executes processes from T216 onward. On the other hand, in a case where the decryption of the encrypted data ED1 does not succeed, the AP 300 determines that the sender of the AReq is not the device that captured the QR code of the AP 300, that is, determines that the authentication has failed, and does not execute the processes from T216 onward.

In T216, the AP 300 creates a new public key APK2 and a new private key ask2 of the AP 300. In a variant, the AP 300 may store the public key APK2 and the private key ask2 in advance. Next, in T217, the AP 300 creates a shared key SK2 according to the ECDH by using the public key TPK1 of the terminal 10 in the AReq of T210 and the created private key ask2 of the AP 300. Then, in T218, the AP 300 encrypts the obtained random value RV1 and a new random value RV2 by using the created shared key SK2 to create encrypted data ED2.

In T220, the AP 300 sends a DPP Authentication Response (hereinbelow simply termed "ARes") to the terminal 10. This ARes includes the public key APK2 of the AP 300 created in T216, the encrypted data ED2 created in T218, and a capability of the AP 300. This capability includes a value indicating that the AP 300 is capable of operating only as the Enrollee.

In T220, the terminal 10 executes the following process for authenticating the sender of this ARes (i.e., the AP 300) in response to receiving the ARes from the AP 300 via the Wi-Fi I/F 16. Specifically, in T222, the terminal 10 creates a shared key SK2 according to the ECDH by using the private key tsk1 of the terminal 10 created in T200 and the public key APK2 of the AP 300 in the ARes. Here, the shared key SK2 created by the AP 300 in T217 is the same as the shared key SK2 created by the terminal 10 in T222. Therefore, in T224, the terminal 10 can appropriately decrypt the encrypted data ED2 in the ARes by using the created shared key SK2, as a result of which the terminal 10 can obtain the random values RV1 and RV2. In a case where the decryption of the encrypted data ED2 succeeds, the terminal 10 determines that the sender of the ARes is the device having the captured QR code, that is, determines that the authentication has succeeded, and executes processes from T230 onward. On the other hand, in a case where the decryption of the encrypted data ED2 does not succeed, the terminal 10 determines that the sender of the ARes is not the device having the captured QR code, that is, determines that the authentication has failed, and does not execute the processes from T230 onward.

In T230, the terminal 10 sends Confirm to the AP 300 via the Wi-Fi I/F 16. The Confirm includes information indicating that the terminal 10 operates as the Configurator and the AP 300 operates as the Enrollee. As a result, the terminal 10 determines to operate as the Configurator in T232, and the AP 300 determines to operate as the Enrollee in T234. When the process of T234 completes, the process of FIG. 4 ends. When the process of FIG. 4 ends, the terminal 10 discards the public key TPK1 and the private key tsk1 (i.e., deletes them from the memory 34).

Figure 5:
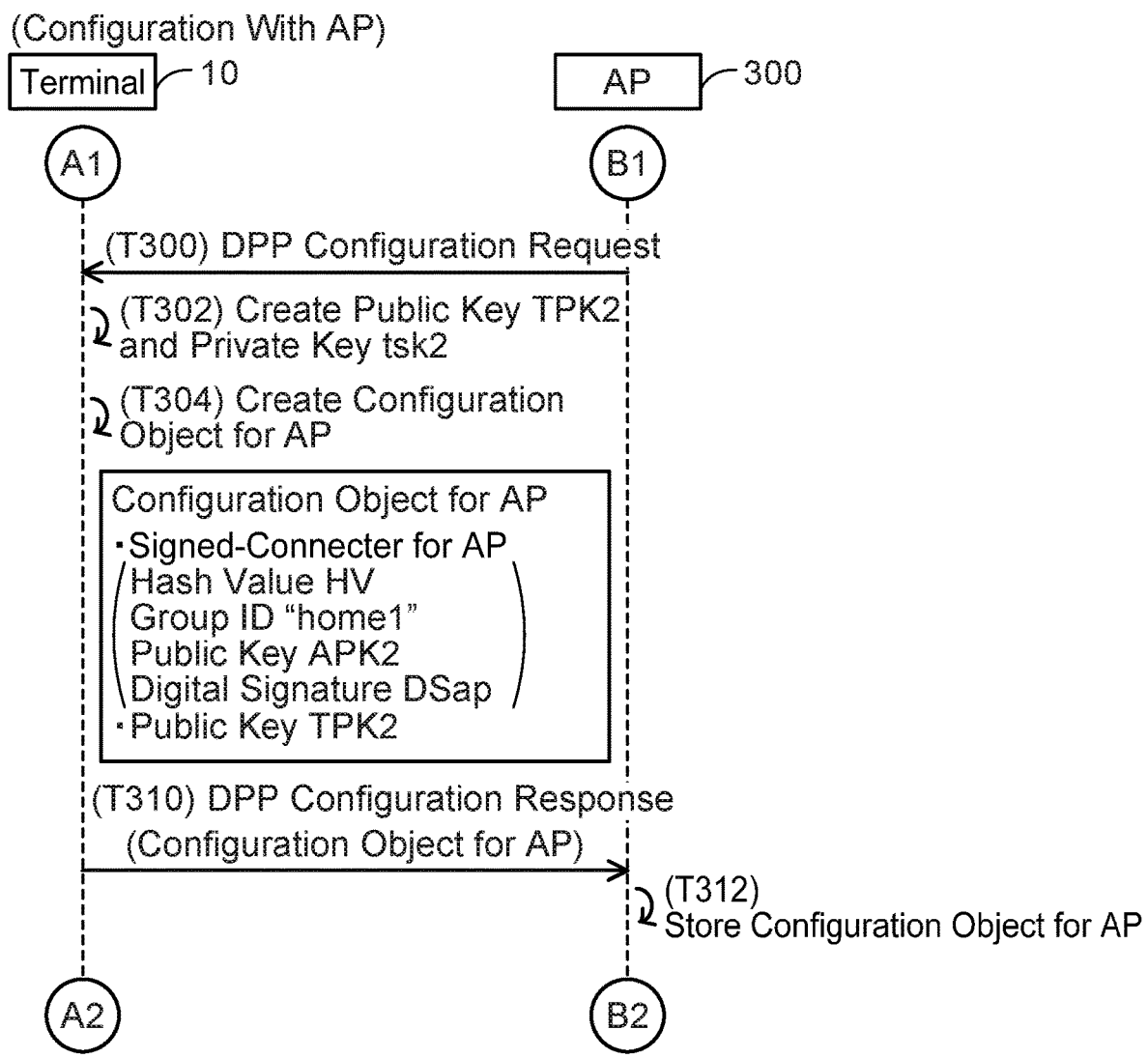
FIG. 5 shows a sequence view of a Configuration process with the AP.

(Configuration (Config) With AP; FIG. 5)

Next, the Config process executed between the terminal 10 and the AP 300 in T6 of FIG. 2 will be described with reference to FIG. 5.

In T300, the AP 300 sends a DPP Configuration Request (hereinbelow simply termed "CReq") to the terminal 10. This CReq is a signal requesting a CO for AP to be sent.

In T300, the terminal 10 receives the CReq from the AP 300 via the Wi-Fi I/F 16. In this case, in T302 the terminal 10 creates a new public key TPK2 and a new private key tsk2 of the terminal 10. The terminal 10 stores the public key TPK2 and the private key tsk2 in the memory 34 in association with the group ID "home1" inputted in T102 of FIG. 4. Next, in T304, the terminal 10 uses the created private key tsk2 to create a CO for AP. Specifically, the terminal 10 executes the following processes.

Firstly, the terminal 10 creates a hash value HV by hashing the public key TPK2 of the terminal 10. Further, the terminal 10 creates a first value by hashing a combination of the hash value HV, the group ID "home1" inputted in T102 of FIG. 4, and the public key APK2 of the AP 300 in the ARes of T220 of FIG. 4. Then, the terminal 10 creates a digital signature DSap according to ECDSA (Elliptic Curve Digital Signature Algorithm) by encrypting the created first value by using the private key tsk2 of the terminal 10. As a result, the terminal 10 can create a Signed-Connector for AP (hereinbelow, Signed-Connector will be simply termed "SC") including the hash value HV, the group ID "home1", the public key APK2 of the AP 300, and the digital signature DSap. Then, the terminal 10 creates the CO for AP including the SC for AP and the public key TPK2 of the terminal 10.

In T310, the terminal 10 sends a DPP Configuration Response (hereinbelow simply termed "CRes") including the CO for AP to the AP 300 via the Wi-Fi I/F 16.

In T310, the AP 300 receives the CRes from the terminal 10. In this case, in T312, the AP 300 stores the CO for AP in this CRes. When the process of T312 completes, the process of FIG. 5 ends.

Figure 6:
FIG. 6 shows a sequence view of a Bootstrapping process and an Authentication process with a printer.

(Bootstrapping (BS) and Authentication (Auth) With Printer; FIG. 6)

Next, the BS process executed between the terminal 10 and the printer 100 in T12 of FIG. 2, and the Auth process executed between the terminal 10 and the printer 100 in T14 will be described with reference to FIG. 6.

T500 to T524 correspond to the BS process, which is realized by the processes of S12 to S24 of FIG. 3. In T500, the terminal 10 again displays the selection screen on the display unit 14 (S12 of FIG. 3). Since the group ID "home1" has been inputted in T102 of FIG. 4, the selection screen includes the "home1" button.

In T502, the terminal 10 receives selection of the "home1" button in the selection screen (NO in S14). Then, the terminal 10 activates the camera 20.

In response to a network connection operation for connecting with a network being executed by the user in T510, in T512 the printer 100 displays the QR code on the display unit 114.

In T520, the terminal 10 uses the camera 20 to capture the QR code displayed on the printer 100 (S20 of FIG. 3).

In T522, the terminal 10 decodes the captured QR code to obtain DPP information DI2 (i.e., the public key PPK1 and the MAC address "macp1") of the printer 100 (S22).

Since the DPP information DI2 is obtained as the coded information, the terminal 10 determines in T524 that the obtained coded information is the DPP information (YES in S24), and executes the Auth process by executing the processes of T600 to T634, to be described later.

In T600, the terminal 10 creates a new public key TPK3 and private key tsk3 of the terminal 10 and, in T601, creates a shared key SK3 according to the ECDH by using the created private key tsk3 and the public key PPK1 of the printer 100 obtained in T522. Then, in T602, the terminal 10 encrypts a random value RV3 by using the created shared key SK3 to create encrypted data ED3.

In T610, the terminal 10 sends an AReq to the printer 100 via the Wi-Fi I/F 16 with the MAC address "macp1" obtained in T522 as the destination. This AReq includes the public key TPK3 of the terminal 10 created in T600, the encrypted data ED3 created in T602, and a capability of the terminal 10. This capability includes a value indicating that the terminal 10 is capable of operating only as the Configurator.

The printer 100 receives the AReq from the terminal 10 in T610. Since this AReq is sent with the MAC address "macp1" of the printer 100 as the destination, the printer 100 can appropriately receive the AReq.

Next, the printer 100 executes processes of T612 and T614 for authenticating the sender of the AReq (i.e., the terminal 10). T612 and T614 are the same as T212 and T214 of FIG. 4 except that different data is used (keys, encrypted data, etc. are different). That is, the printer 100 creates the shared key SK3 by using the public key TPK3 and the private key psk1 in T612, and decrypts the encrypted data ED3 in the AReq by using the shared key SK3 in T614. In this case, the printer 100 determines that the authentication has succeeded and executes processes from T616 onward.

In T616, the printer 100 creates a new public key PPK2 and a new private key psk2 of the printer 100. In a variant, the public key PPK2 and the private key psk2 may be stored in advance in the memory 134. T617 and T618, which are executed subsequently, are the same as T217 and T218 of FIG. 4 except that different data is used (keys, encrypted data, etc. are different). That is, in T617, the printer 100 creates a shared key SK4 by using the public key TPK3 and the private key psk2, and encrypts the random values RV3, RV4 by using the shared key SK4 to create encrypted data ED4 in T618.

In T620, the printer 100 sends an ARes to the terminal 10. This ARes includes the public key PPK2 of the printer 100 created in T616, the encrypted data ED4 created in T618, and a capability of the printer 100. This capability includes a value indicating that the printer 100 is capable of operating only as the Enrollee.

T622 to T634 are the same as T222 to T234 of FIG. 4 except that the communication target is the printer 100, and that the public key PPK2, the encrypted data ED4, the private key tsk3, the shared key SK4, and the random values RV3, RV4 are used by the terminal 10. As a result, the terminal 10 determines to operate as the Configurator, and the printer 100 determines to operate as the Enrollee. When the process of T634 completes, the process of FIG. 6 ends. When the process of FIG. 6 ends, the terminal 10 discards the public key TPK3 and the private key tsk3 (i.e., deletes them from the memory 34).

Figure 7:
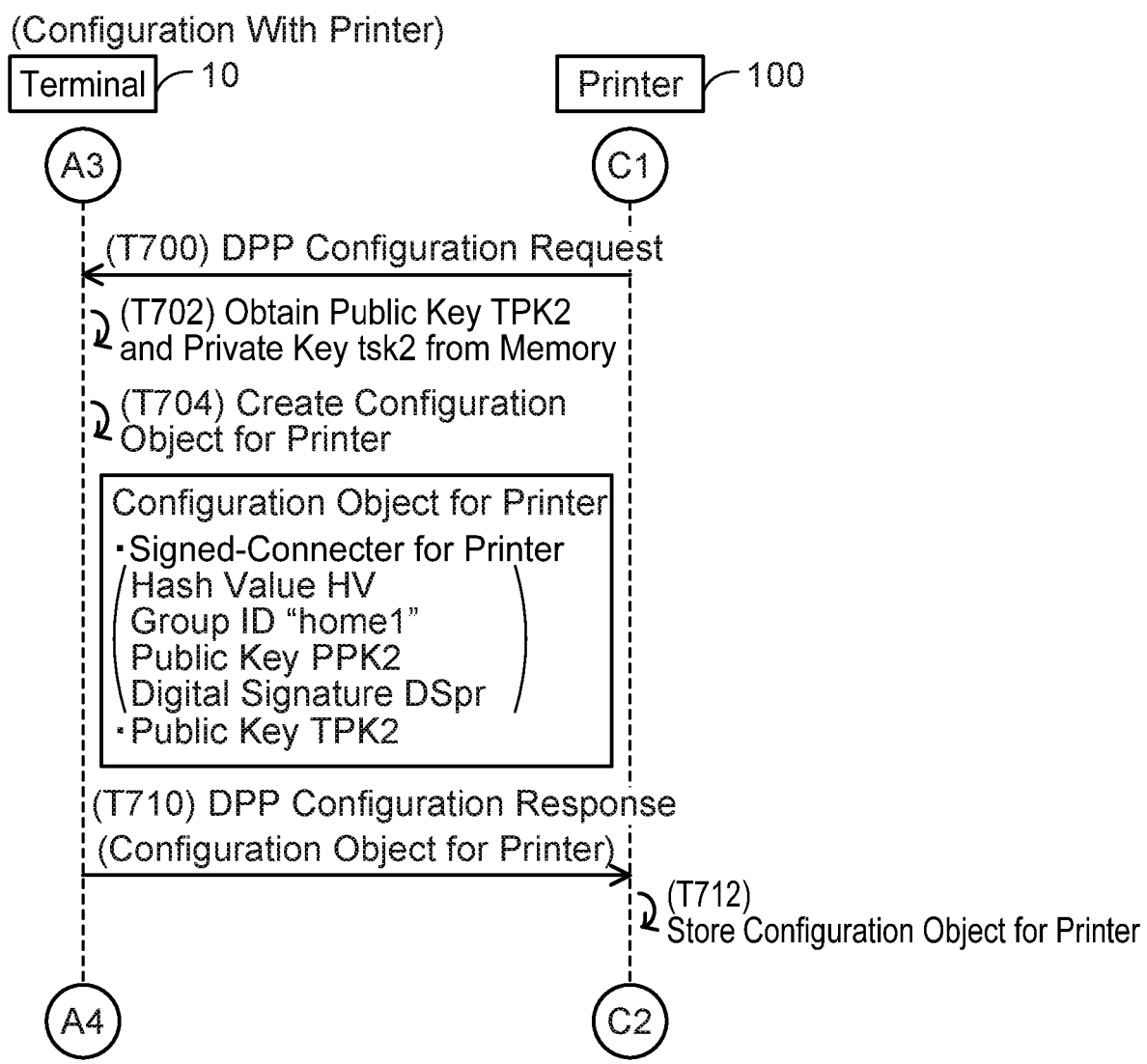
FIG. 7 shows a sequence view of a Configuration process with the printer.

(Configuration Process With Printer; FIG. 7)

Next, the Config process executed between the terminal 10 and the printer 100 in T16 of FIG. 2 will be described with reference to FIG. 7.

In T700, the printer 100 sends a CReq to the terminal 10. This CReq is a signal requesting a CO for printer to be sent.

The terminal 10 receives the CReq from the printer 100 via the Wi-Fi I/F 16 in T700. In this case, in T702 the terminal 10 obtains, from the memory 34, the public key TPK2 and the private key tsk2 stored in association with a same character string as "home1" selected in T502 of FIG. 6.

In T704, the terminal 10 creates a CO for printer. T704 is the same as T304 of FIG. 5 except that different data is used (key, etc. is different). The CO for printer includes an SC for printer and the public key TPK2 obtained in T702. The SC for printer includes the hash value HV, the group ID "home1", the public key PPK2 of the printer 100 and a digital signature DSpr. The digital signature DSpr is information in which a second value, obtained by hashing a combination of the hash value HV, the group ID "home1", and the public key PPK2, is encrypted by the private key tsk2 obtained in T702.

In T710, the terminal 10 sends a CRes including the CO for printer created in T704 to the printer 100 via the Wi-Fi I/F 16.

The printer 100 receives the CRes from the terminal 10 in T710. In this case, in T712 the printer 100 stores, in the memory 134, the CO for printer in this CRes. When the process of T712 completes, the process of FIG. 7 ends.

Figure 8:
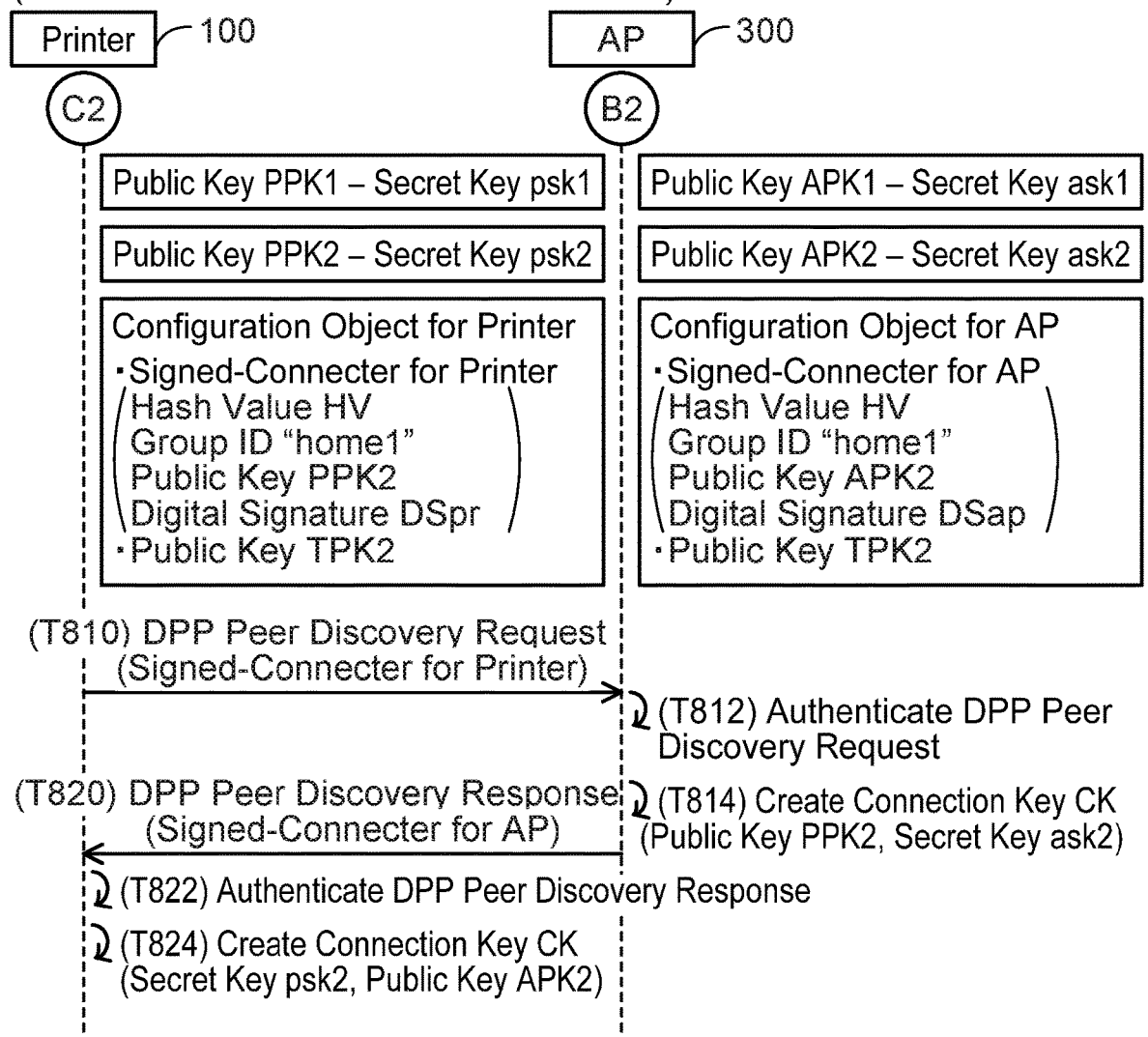
FIG. 8 shows a sequence view of a Network Access process.

(Network Access (NA); FIG. 8)

Next, an NA process of T18 of FIG. 2 executed between the printer 100 and the AP 300 will be described with reference to FIG. 8. In an initial state of FIG. 8, the printer 100 is storing the public keys PPK1, PPK2, the private keys psk1, psk2, and the CO for printer. Further, the AP 300 is storing the public keys APK1, APK2, the private keys ask1, ask2, and the CO for AP.

In T810, the printer 100 sends, to the AP 300, a DPP Peer Discovery Request (hereinbelow simply termed "DReq") including the SC for printer in the CO for printer. This DReq is a signal requesting the AP 300 to execute authentication and to send the SC for AP. The DReq is sent by broadcast.

In response to receiving the DReq from the printer 100 in T810, the AP 300 executes the process of T812 for authenticating the sender of the DReq (i.e., the printer 100), and the respective information in the DReq (i.e., the hash value HV, "home1", and the public key PPK2). Specifically, in T812 the AP 300 firstly executes a first AP determination process related to whether the hash value HV and the group ID "home1" in the SC for printer respectively match the hash value HV and the group ID "home1" in the SC for AP. In the case of FIG. 8, the AP 300 determines "matching" in the first AP determination process, thus determining that the authentication of the sender of the DReq (i.e., the terminal 10) has succeeded. Determining "matching" in the first AP determination process means that the SC for printer and the SC for AP were created by the same device (i.e., the terminal 10). Therefore, the AP 300 also determines that authentication for a creator of the SC for printer (i.e., the terminal 10) has succeeded. Further, the AP 300 decrypts the digital signature DSpr in the SC for printer by using the public key TPK2 of the terminal 10 included in the CO for AP. In the case of FIG. 8, since the digital signature DSpr is successfully decrypted, the AP 300 executes a second AP determination process related to whether the second value obtained by decrypting the digital signature DSpr matches a value obtained by hashing the respective information in the SC for printer (i.e., the hash value HV, "home1", and the public key PPK2). In the case of FIG. 8, the AP 300 determines "matching" in the second AP determination process, thus the AP 300 determines that the authentication for the respective information in the DReq has succeeded and executes processes from T814 onward. Determining "matching" in the second AP determination process means that the respective information in the SC for printer have not been falsified by a third party after the CO for printer had been stored in the terminal 10. On the other hand, in a case where "not matching" is determined in the first AP determination process, in a case where the decryption of the digital signature DSpr fails, or in a case where "not matching" is determined in the second AP determination process, the AP 300 determines that the authentication has failed and does not execute the processes from T814 onward.

Next, in T814, the AP 300 creates a connection key (i.e., shared key) CK according to the ECDH by using the public key TPK2 of the terminal 10 included in the CO for AP, and the private key ask2 of the AP 300.

In T820, the AP 300 sends a DPP Peer Discovery Response (hereinbelow simply termed "DRes") including the SC for AP to the printer 100.

In response to receiving the DRes from the AP 300 in T820, the printer 100 executes a process for authenticating the sender of the DRes (i.e., the AP 300), and the respective information in the DRes (i.e., the hash value HV, "home1", and the public key APK2). Specifically, in T822, the printer 100 firstly executes a first PR determination process related to whether the hash value HV and the group ID "home1" in the SC for AP respectively match the hash value HV and the group ID "home1" in the SC for printer. In the case of FIG. 8, the printer 100 determines "matching" in the first PR determination process, thus the printer 100 determines that the authentication for the sender of the DRes (i.e., the AP 300) has succeeded. Here, determining "matching" in the first PR determination process means that the SC for printer and the SC for AP were created by the same device (i.e., the terminal 10). Consequently, the printer 100 also determines that authentication for the creator of the SC for printer (i.e., the terminal 10) has succeeded. Further, the printer 100 decrypts the digital signature DSap in the SC for AP by using the public key TPK2 of the terminal 10 included in the CO for printer. In the case of FIG. 8, the decryption of the digital signature DSap succeeds, and therefore the printer 100 executes a second PR determination process related to whether the first value obtained by decrypting the digital signature DSap matches a value obtained by hashing the respective information in the SC for AP (i.e., the hash value HV, "home", and the public key APK2). In the case of FIG. 8, the printer 100 determines "matching" in the second PR determination process, thus the printer 100 determines that the authentication for the respective information in the DRes has succeeded, and executes processes from T824 onward. On the other hand, in a case where "not matching" is determined in the first PR determination process, in a case where the decryption of the digital signature DSap fails, or in a case where "not matching" is determined in the second PR determination process, the printer 100 determines that the authentication has failed, and does not execute the processes from T824 onward.

In T824, the printer 100 creates a connection key CK according to the ECDH by using the private key psk2 of the printer 100 and the public key APK2 of the AP 300 in the SC for AP. Here, the connection key CK created by the AP 300 in T814 is the same as the connection key CK created by the printer 100 in T824. Thereby, the connection key CK for establishing the DPP connection is shared between the printer 100 and the AP 300. When T824 completes, the process of FIG. 8 ends.

As described above, after the connection key CK has been shared between the printer 100 and the AP 300, in T20 of FIG. 2 the printer 100 and the AP 300 execute communication of 4 way-handshake by using the connection key CK. As a result, a DPP connection is established between the printer 100 and the AP 300.

(Non-DPP Process; FIG. 9)

The non-DPP process executed in S28 of FIG. 3 will be described with reference to FIG. 9. In an initial state of FIG. 9, a normal Wi-Fi connection has been established between the terminal 10 and the AP 400. Further, the printer 200 is operating as the G/O. Further, by executing the processes of T850, T852, the printer 200 displays the QR code on the display unit 214.

T842 is the same as T102 of FIG. 4 except that a new group ID "home2" is inputted. In T860, the terminal 10 uses the camera 20 to capture the QR code displayed on the printer 200 (S20 of FIG. 3).

In T862, the terminal 10 decodes the captured QR code to obtain WFD information WI (i.e., the SSID "p002" and the password "xxx") of the printer 200 (S22).

Since the WFD information WI is obtained as the coded information, the terminal 10 determines in T864 that the obtained coded information is the WFD information (NO in S24), and proceeds to T870.

In T870, the terminal 10 uses the obtained WFD information WI to execute a communication of 4 way-handshake with the printer 200, and establishes wireless connection complying with the WFD scheme (hereinbelow termed "WFD connection") with the printer 200. Specifically, during at least a part of the communication of 4 way-handshake, the terminal 10 sends encrypted information, which was encrypted using a key created from the SSID "p002" and the password "xxx", to the printer 200. Then, in a case where the encrypted information is successfully decrypted, a WFD connection between the terminal 10 and the printer 200 is established.

In T872, the terminal 10 displays a password input screen on the display unit 14. The password input screen includes the SSID "a002" for identifying the Wi-Fi network of the AP 400 in which the terminal 10 is currently participating, and an input field for inputting a password to be used in this Wi-Fi network. Thereby, the terminal 10 can cause the user to input the password of the AP 400.

The password input screen further includes a "New" button. In a case where the "New" button is selected, the terminal 10 displays an AP information input screen on the display unit 14. The AP information input screen includes an input field for inputting AP information (i.e., SSID and password). By having the AP information be input to this input field, the terminal 10 can cause the printer 100 to participate in a Wi-Fi network different from the Wi-Fi network in which the terminal 10 is currently participating (i.e., can cause the printer 100 to participate in a network formed by an AP different from the AP 400).

Figure 9:
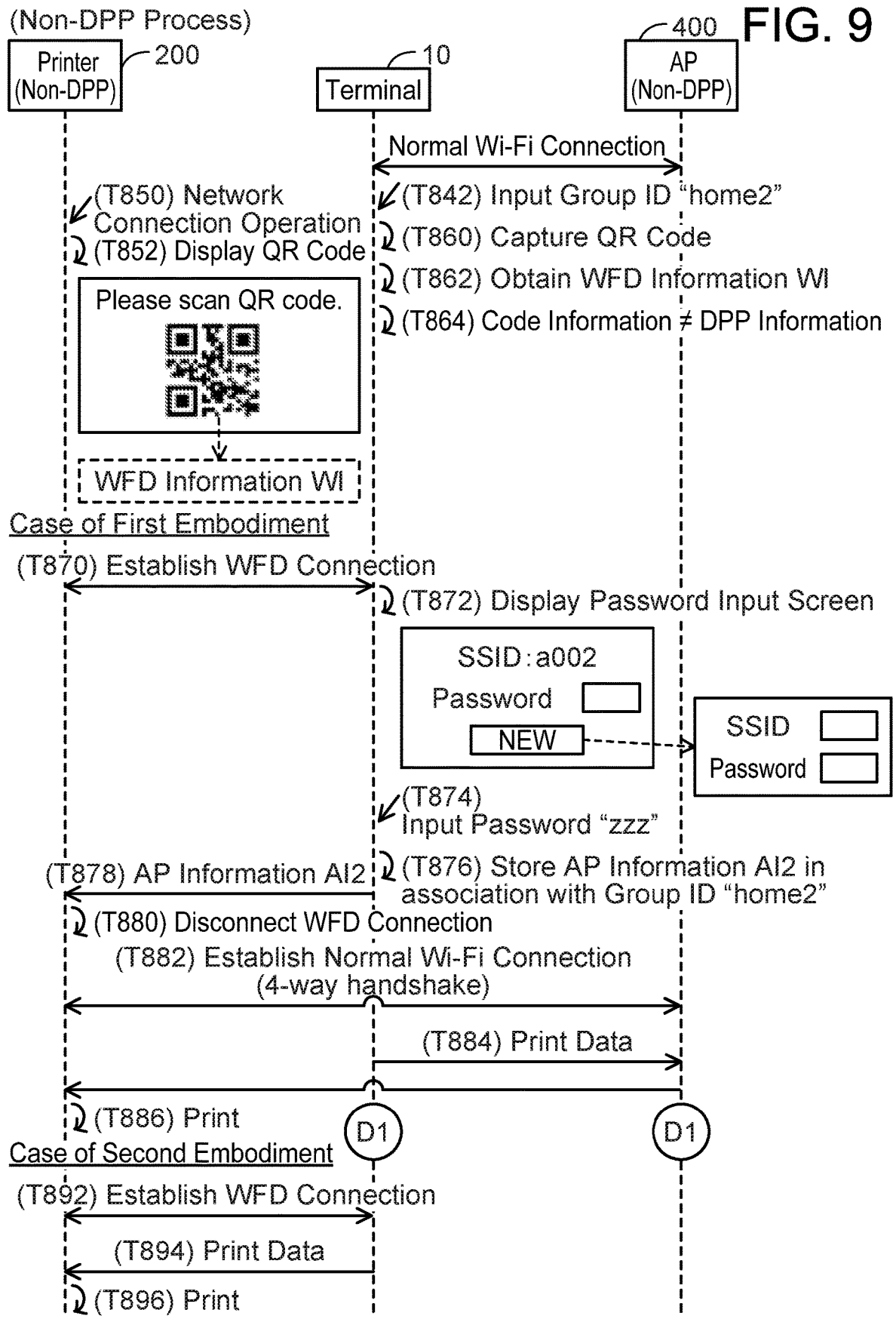
FIG. 9 shows a sequence view of a non-DPP process.

In the case of FIG. 9, the password "zzz" of the AP 400 is input in the input field of the password input screen. Upon receiving the input of the password "zzz" of the AP 400 in T874, in T876 the terminal 10 stores the AP information AI2 of the AP 400 in the memory 34 in association with the group ID "home2" inputted in T842.

In T878, the terminal 10 uses the WFD connection established in T870 to send the AP information AI2 to the printer 200 via the Wi-Fi I/F 16. By using the WFD connection to send the AP information AI2, the AP information AI2 can be sent with the printer 200 as the destination, and it is possible to prevent the AP information AI2 from being sent to a device other than the printer 200.

Upon receiving the AP information AI2 from the terminal 10 in T878, and, in T880, the printer 200 disconnects the WFD connection established in T870.

In T882, the printer 200 uses the AP information AI2 to execute a communication of 4 way-handshake with the AP 400. Thereby, a normal Wi-Fi connection is established between the printer 200 and the AP 400.

In FIG. 9, a normal Wi-Fi connection has already been established between the terminal 10 and the AP 400. For this reason, the printer 200 participates in the Wi-Fi network formed by the AP 400, whereupon both the terminal 10 and the printer 200 achieve a state of participating in the Wi-Fi network. For this reason, in T884 the printer 200 can receive print data from the terminal 10 via the AP 400. In this case, in T886 the printer 200 executes printing in accordance with this print data.

Figure 10:
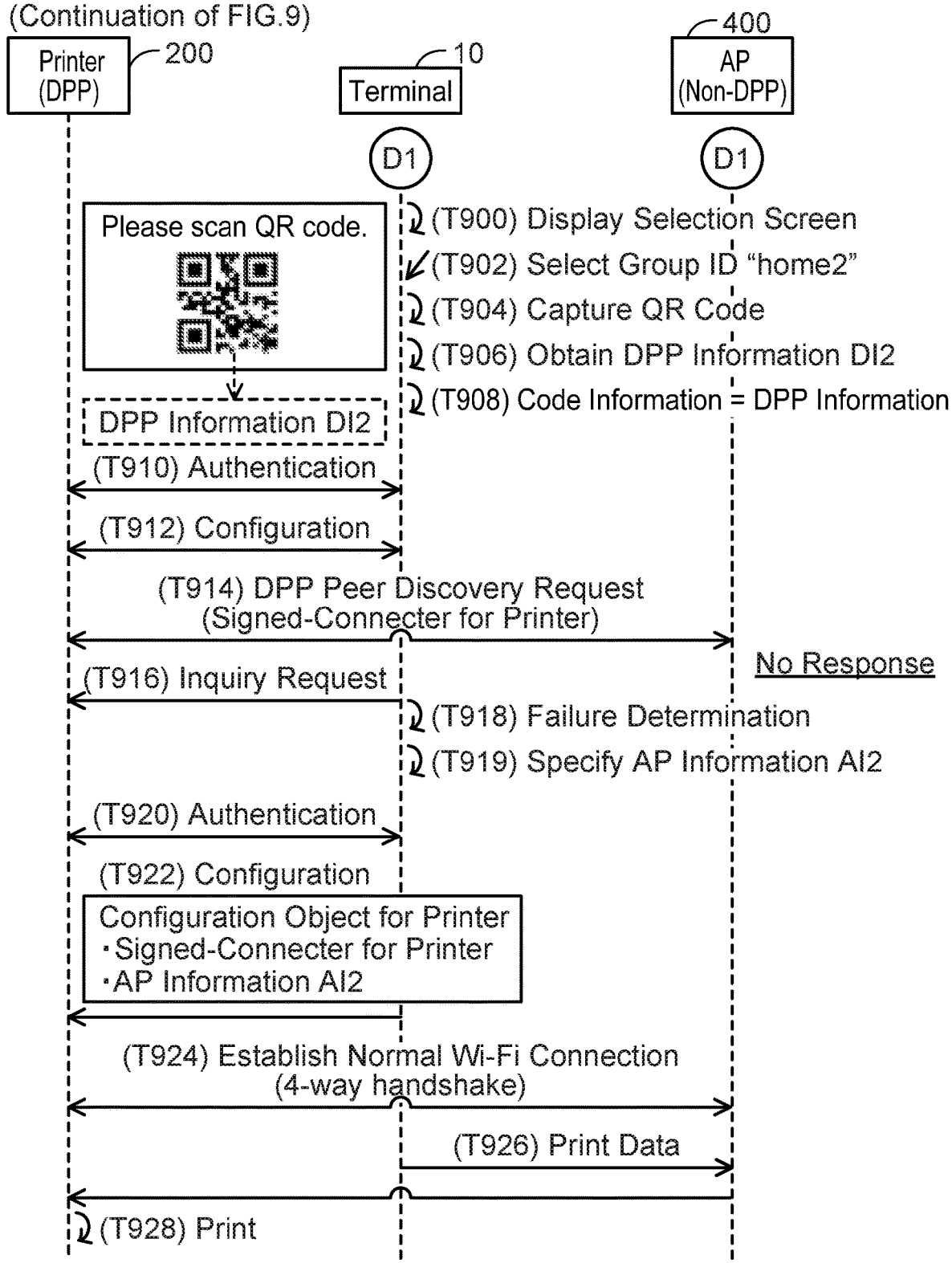
FIG. 10 shows a sequence view of a continuation of FIG. 9.

(Case in Which DPP Printer is Caused to Participate in Same Wi-Fi Network; FIG. 10)

A case in which, following the process of FIG. 9, the DPP printer 100 is caused to participate in the Wi-Fi network formed by the AP 400 will be described with reference to FIG. 10. In an initial state of FIG. 10, the printer 100 is displaying the QR code.

In T900, the terminal 10 again displays the selection screen on the display unit 14 (S12 of FIG. 3). Since the group ID "home2" has been inputted in T842 of FIG. 9, the selection screen includes a "home2" button.

In T902, the terminal 10 receives selection of the "home2" button in the selection screen (NO in S14). Then, the terminal 10 activates the camera 20.

T904, T908 are the same as T522, T524 of FIG. 6. As a result, the terminal 10 executes the Auth process the same as FIG. 6 in T910, and executes the Config process the same as FIG. 7 in T912.

When the Config process of T912 completes, the printer 100 starts the NA process. Thereby, in T914 the printer 100 sends a DReq by broadcast, as in T810 of FIG. 8. Although the AP 400 receives the DReq from the printer 100, due to the AP 400 not supporting the DPP scheme, the AP 400 does not send a response (i.e., a DRes) to the DReq to the printer 100. As a result, a DPP connection is not established between the printer 100 and the AP 400.

Further, when the Config process of T912 completes, the terminal 10 starts repeatedly sending an Inquiry Request to the printer 100 in T916. As described above, since a DPP connection is not established between the printer 100 and the AP 400, the printer 100 does not send, to the terminal 10, a response to the Inquiry Request.

When a predetermined time has elapsed without receiving a response since the terminal 10 started sending of the Inquiry Request, the terminal 10 determines in T918 that the establishment of the DPP connection has failed, and proceeds to T919.

As described above, in T876 of FIG. 9 the terminal 10 stores the AP information AI2 of the AP 400 in the memory 34 in association with the group ID "home2". In T919, the terminal 10 uses the group ID "home2" selected in T902 to specify the AP information AI2 from the memory 34.

Next, in T920, the terminal 10 again executes the Auth process the same as T910, and starts the Config process in T922.

The Config process started in T922 is the same as FIG. 7 except that the information in the CO for printer is different from T704 of FIG. 7. Specifically, the terminal 10 sends, to the printer 100, a CO for printer including the SC for printer and the AP information AI2 specified in T919.

Upon receiving the CO for printer including the AP information AI2 from the terminal 10 in T922, in T924 the printer 100 executes a communication of 4 way-handshake with the AP 400 by using the AP information AI2 in the CO for printer. Thereby, a normal Wi-Fi connection is established between the printer 100 and the AP 400. T926, T928 are the same as T884, T886 of FIG. 9 except that printing is performed by the printer 200.

According to the case shown in FIG. 9, FIG. 10, after the normal Wi-Fi connection has been established between the printer 200 and the AP 400, the terminal 10 uses the AP information AI2 stored in the memory 34 in T876 of FIG. 9 to establish a normal Wi-Fi connection between the printer 100 and the AP 400 (T924 of FIG. 10). According to this configuration, the user may not have to input the password "zzz" of the AP 400 to the terminal 10 in order to cause the second printer 100 to participate in the Wi-Fi network of the AP 400. User convenience is improved.

Further, the terminal 10 sends the AP information AI2 to the printer 100 (T922 of FIG. 10) even in the case where a DPP connection is not established between the printer 100 and the AP 400 due to the AP 400 not supporting the DPP scheme. Thereby, a normal Wi-Fi connection can be established between the printer 100 and the AP 400 even in the case where a DPP connection cannot be established by using the obtained DPP information.

Further, the terminal 10 sends the AP information AI2 to the printer 100 (T922 of FIG. 10) by using the Config after executing authentication by the Auth according to the DPP scheme. For example, a comparative example is assumed in which a WFD connection is established instead of the Auth and the Config, and the AP information AI2 is sent to the printer 100 by using this WFD connection. That is, in the comparative example, the AP information AI2 is sent to the printer 100 by using the same method as the process of FIG. 9. Contrary to this, the present case uses the Auth and the Config without establishing a WFD connection. That is, the AP information AI2 for establishing a normal Wi-Fi connection can be sent to the printer 100 without establishing wireless connection with the printer 100. In a variant, the aforementioned comparative example may be adopted.

Figure 11:
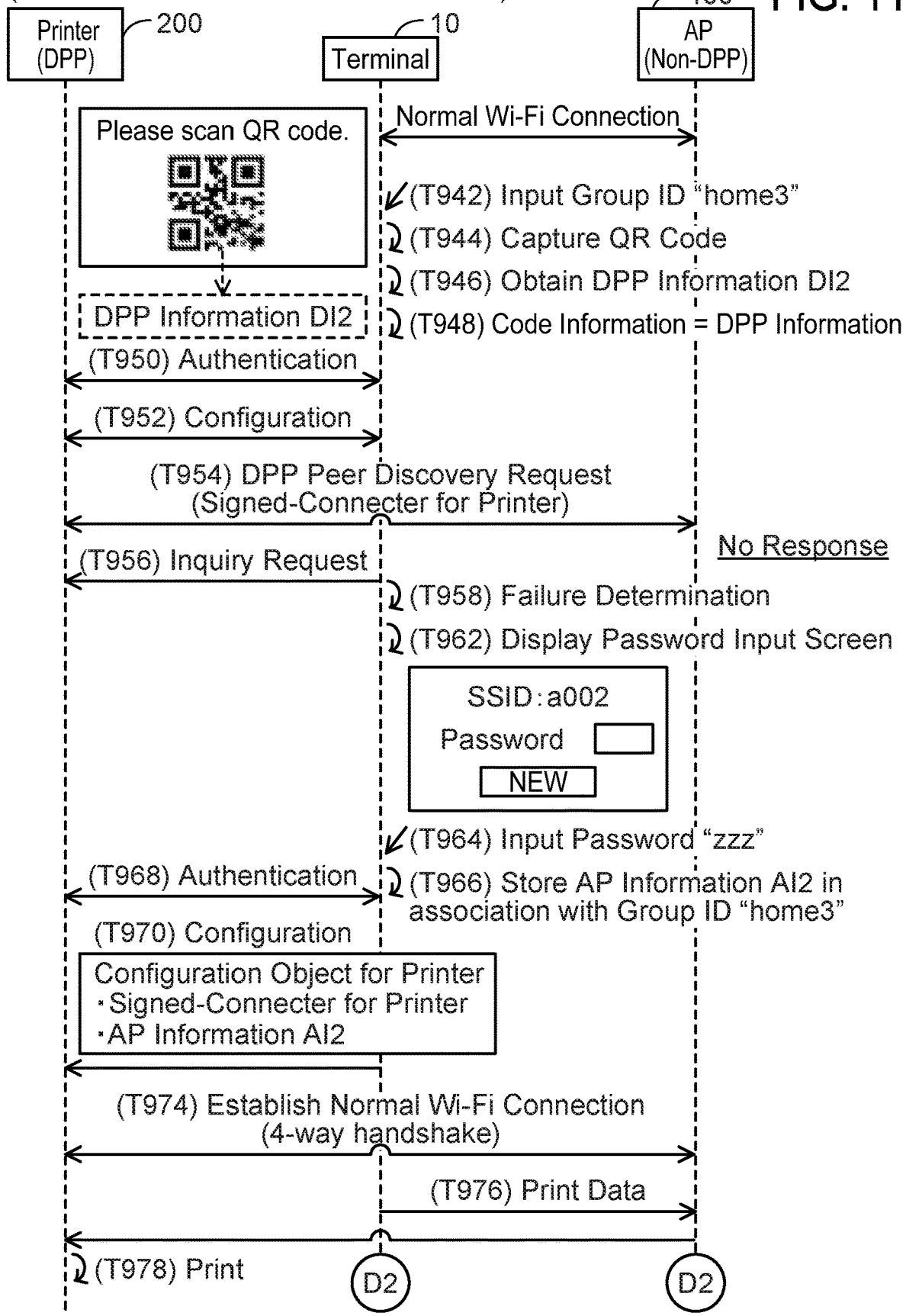
FIG. 11 shows a sequence view of a process in a case where a normal Wi-Fi connection is established between a DPP printer and a non-DPP AP.

(Case of Establishing Normal Wi-Fi Connection Between DPP Printer and Non-DPP AP; FIG. 11)

In FIG. 11, a case will be described in which a new group ID is input, and the DPP printer 100 is caused to participate in the Wi-Fi network formed by the AP 400. In an initial state of FIG. 11, the printer 100 is displaying a QR code.

In T942, the terminal 10 starts the app 38, and displays the selection screen on the display unit 14 (S12 of FIG. 3). Then, the "New" button in the selection screen is selected, and a new group ID "home3" is inputted (S18).

T944 to T958 are the same as T904 to T918 of FIG. 10. In T962, the terminal 10 displays, on the display unit 14, a password input screen including the SSID "a002" for identifying the Wi-Fi network of the AP 400, which is the Wi-Fi network in which the terminal 10 is currently participating, and an input field for inputting a password.

Upon receiving input of the password "zzz" of the AP 400 in T964, in T966 the terminal 10 stores the AP information AI2 of the AP 400 in the memory 34 in association with the group ID "home3" inputted in T942.

T968 to T974 are the same as T920 to T924 of FIG. 10. That is, the Auth process is executed again and, in the Config process, the CO for printer including the AP information AI2 is sent to the printer 100. Thereby, a normal Wi-Fi connection is established between the printer 100 and the AP 400. T976, T978 are the same as T926, T928 of FIG. 10.

According to the case of FIG. 11, the terminal 10 sends the AP information AI2 to the printer 100 (T970) even in the case where a DPP connection is not established between the printer 100 and the AP 400 due to the AP 400 not supporting the DPP scheme. Thereby, a normal Wi-Fi connection can be established between the printer 100 and the AP 400 even in the case where a DPP connection cannot be established by using the obtained DPP information.

Further, in the present case, as in the case of FIG. 10, the AP information AI2 for establishing a normal Wi-Fi connection can be sent to the printer 100 by using the Auth and the Config without establishing wireless connection (e.g., a WFD connection) with the printer 100.

(Case of Causing Non-DPP Printer to Participate in Same Wi-Fi Network; FIG. 12)

A case in which, following the process of FIG. 11, the non-DPP printer 200 is caused to participate in the Wi-Fi network formed by the AP 400 will be described with reference to FIG. 12. In an initial state of FIG. 12, the printer 200 is displaying a QR code.

In T980, the terminal 10 again displays the selection screen on the display unit 14 (S12 of FIG. 3). Since the group ID "home3" has been input in T942 of FIG. 11, the selection screen includes a "home3" button.

In T982, the terminal 10 receives selection of the "home3" button in the selection screen (NO in S14). Then, the terminal 10 activates the camera 20.

T984 to T990 are the same as T860 to T870 of FIG. 9. That is, a WFD connection is established between the terminal 10 and the printer 200.

As described above, the terminal 10 stores the AP information AI2 of the AP 400 in the memory 34 in association with the group ID "home3" in T966 of FIG. 11. In T992, the terminal 10 uses the group ID "home3" selected in T982 to specify the AP information AI2 from the memory 34. T994 to T998 are the same as T878 to T886 of FIG. 9.

Figure 12:
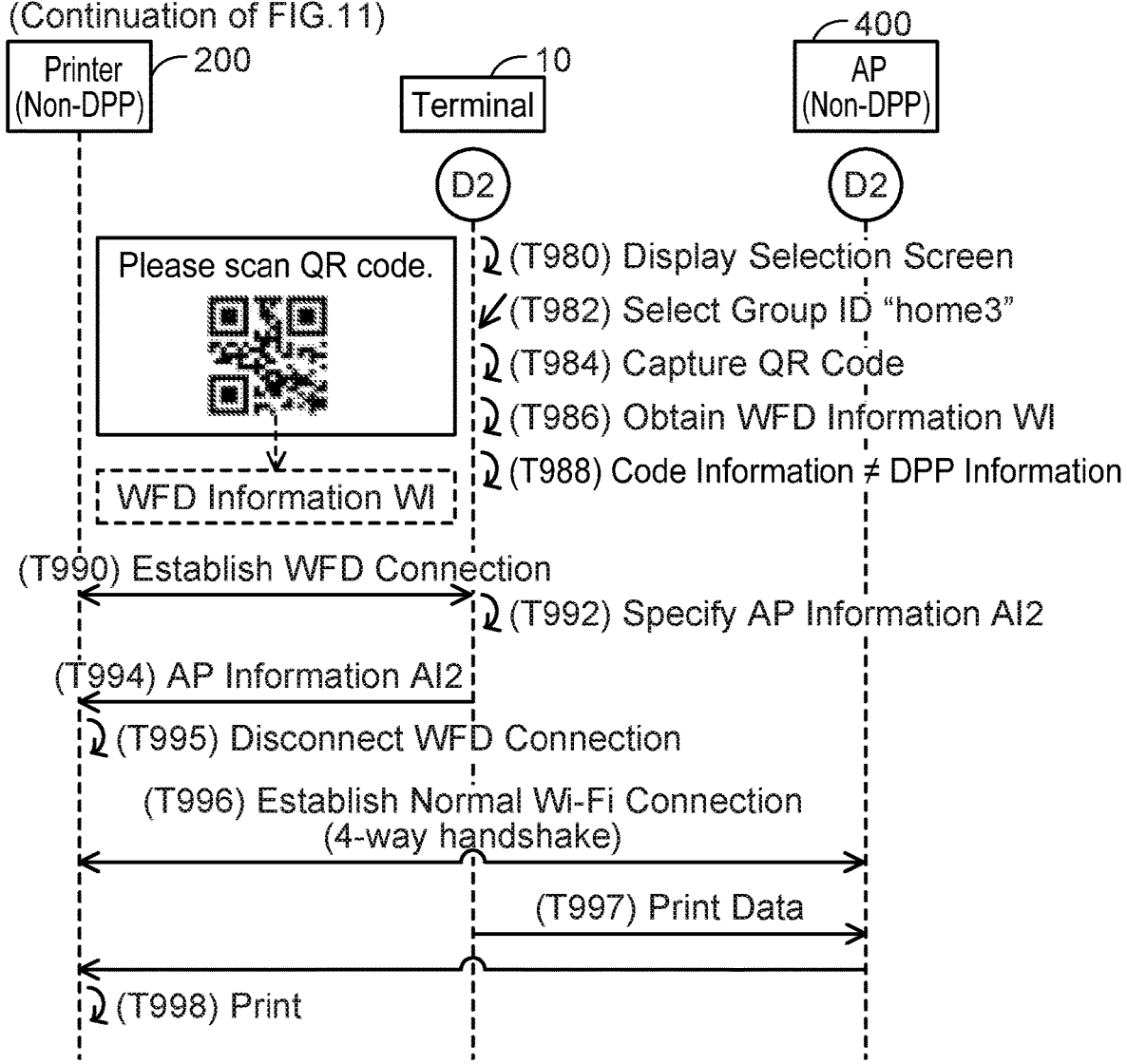
FIG. 12 shows a sequence view of a continuation of FIG. 11.

According to the case of FIG. 12, after the normal Wi-Fi connection has been established between the printer 100 and the AP 400, the terminal 10 uses the AP information AI2 stored in the memory 34 in T966 of FIG. 11 to establish a normal Wi-Fi connection between the printer 200 and the AP 400 (T996 of FIG. 12). According to this configuration, the user may not have to input the password "zzz" of the AP 400 to the terminal 10 in order to cause the second printer 200 to participate in the Wi-Fi network of the AP 400. User convenience is improved.

Effect of the Present Embodiment

According to the configuration of the present embodiment, in the case of obtaining DPP information including the public key PPK1 (YES in S24 of FIG. 3), the terminal 10 sends the CO for printer to the printer 100 by using the DPP information (T710 of FIG. 7). Thereby, a DPP connection complying with the DPP scheme is established between the DPP printer 100 and the AP 300 (T20 of FIG. 2). Further, in the case of obtaining WFD information different from the DPP information (NO in S24 of FIG. 3), the terminal 10 establishes a WFD connection by using the WFD information (T870 of FIG. 9), and sends the AP information AI2 to the non-DPP printer 200 by using the established WFD connection (T878). Thereby, a normal Wi-Fi connection not complying with the DPP scheme is established between the printer 200 and the AP 400 (T882). Therefore, irrespective of whether the printer is a device capable of executing wireless communication complying with the DPP scheme (i.e., a device supporting the DPP scheme), or a device incapable of executing the wireless communication complying with the DPP scheme (i.e., a device not supporting the DPP scheme), wireless connection can be established between the printer and the AP.

Correspondence Relationship

The terminal 10 is an example of "a terminal device". The DPP scheme is an example of "a predetermined rule". The DPP printer 100, the DPP information DI2, the AP 300 are an example of "a first type of communication device", "first type of related information", "a first external device", respectively. The CO for printer of T710 of FIG. 7, the DPP connection of T20 of FIG. 2 are an example of "first connection information", "first type of wireless connection", respectively. The non-DPP printer 200, the WFD information WI, the AP 400 are an example of "second type of communication device", "second type of related information", "a second external device", respectively. The AP information AI2 of T878, the normal Wi-Fi connection of T882, both of FIG. 9, are an example of "second connection information", "second type of wireless connection", respectively. The SSID "a002", the password "zzz" are an example of "a first SSID", "a first password", respectively. The password input screen of T872 of FIG. 9 is an example of "input screen". The SSID "p002", the password "xxx" are an example of "a second SSID", "a second password", respectively. The WFD connection of T870 of FIG. 9 is an example of "third type of wireless connection". The CO for printer of T922 of FIG. 10 is an example of "third connection information". The SSID "a002", the password "zzz" are an example of "a third SSID", "a third password", respectively. The CO for printer of T970 of FIG. 11 is an example of "fourth connection information".

S22 of FIG. 3, T710 of FIG. 7, T878 of FIG. 9 are an example of "obtain the related information", "send first connection information", "send second connection information", respectively.

Second Embodiment

The present embodiment is the same as the first embodiment except that the contents of the non-DPP process of FIG. 9 are different. In this embodiment, when the terminal 10 determines in T864 that the obtained coded information is WFD information (NO in S24), in T892 the terminal 10 establishes a WFD connection with the printer 200 by using the obtained WFD information WI. Then, in T894, the terminal 10 sends print data to the printer 200 by using the established WFD connection. Thereby, in T896, the printer 200 executes printing in accordance with the print data.

In this embodiment, also, as in the first embodiment, irrespective of whether a printer is a device supporting the DPP scheme, or a device not supporting the DPP scheme, wireless connection can be established between the printer and the AP. Then, the terminal 10 can send the print data to the printer by using the established wireless connection, that is, the DPP connection or the WFD connection. The terminal 10, the WFD connection of T892 of FIG. 9 are an example of the "second external device", the "second type of wireless connection", respectively, and the SSID "p002" and the encrypted information sent to the printer 200 in T892 of FIG. 9 is an example of the "second connection information".

(Variant 1) In each of the above embodiments, the printer 100 and the printer 200 display the QR code (T512 of FIG. 6 or T852 of FIG. 9). Alternatively, the respective printers may print an image including a QR code onto a print medium instead of displaying the QR code. Further, the respective printers may display a bar code instead of the QR code. In the present variant, the printing of the QR code, the displaying of the bar code are examples of "output related information".

(Variant 2) In each of the above embodiments, the printer 100 and the printer 200 display the QR code (T512 of FIG. 6 or T852 of FIG. 9). Alternatively, the respective printers may send the DPP information or WFD information to the terminal 10 by using wireless communication complying with a communication scheme such as Bluetooth (registered trademark), NFC (Near Field Communication), infrared communication, TransferJet, Wi-Fi scheme in-band function, etc. In the present variant, the sending of DPP information or WFD information by using any of the respective aforementioned wireless communications is an example of "output related information".

(Variant 3) In each of the above embodiments, a DPP connection is established between the printer 100 and the AP 300 (T20 of FIG. 2). Alternatively, the processes of T2 to T6 may not be executed, the printer 100 may operate as a parent station of the AP, and the terminal 10 may create a CO for terminal after the Config of T16. Then, the terminal 10 and the printer 100 may execute the NA according to the DPP scheme by using the CO for printer and the CO for terminal. Thereby, a DPP connection may be established between the terminal 10 and the printer 100. In the present variant, the terminal 10 is an example of the "first external device".

(Variant 4) In the above first embodiment, the printer 200 establishes a normal Wi-Fi connection with the AP 400 which does not support the DPP scheme in the non-DPP process of FIG. 9 (T882). Alternatively, the printer 200 may establish a normal Wi-Fi connection with the AP 300 supporting the DPP scheme. In the present variant, the AP 300 is an example of the "second external device".

(Variant 5) In the above first embodiment, the printer 200 displays the QR code obtained by using the WFD information WI (T852 of FIG. 9), and establishes a WFD connection with the terminal 10 (T870). Alternatively, the printer 200 may display a QR code obtained by using information (e.g., a PIN code) for establishing wireless connection complying with the Bluetooth scheme, and establish wireless connection complying with the Bluetooth scheme with the terminal 10. In the present variant, the terminal 10, the wireless connection complying with the Bluetooth scheme are an example of the "second external device", the "third type of wireless connection", respectively, and the "second SSID", the "second password" may be omitted. Further, in the above second embodiment, also, instead of the WFD connection of T892, the printer 200 may establish wireless connection complying with the Bluetooth scheme with the terminal 10. In the present variant, the wireless connection complying with the Bluetooth scheme is an example of the "second type of wireless connection".

(Variant 6) In each of the above embodiments, the printer 200 displays the QR code obtained by using the WFD information WI (T852 of FIG. 9). Alternatively, the printer 200 may display a QR code obtained by using not only the WFD information WI but also information including the public key of the printer 200. In the present variant, the "second type of related information" may include the public key of the second type of communication device.

(Variant 7) The process of T872 of FIG. 9 may not be executed. In the present variant, "cause a display unit to display an input screen" may be omitted.

(Variant 8) In each of the above embodiments, the WFD information WI includes the SSID "p002" and the password "xxx". Alternatively, the WFD information WI may include, for example, a MAC address of the printer 200, a device name of the printer 200. Then, the terminal 10 may establish a WFD connection with the printer 200 by using the MAC address, device name etc. In the present variant, the "second SSID", the "second password" may be omitted.

(Variant 9) In each of the above embodiments, the terminal 10 establishes a WFD connection with the printer 200 (T870 or T892 of FIG. 9). Alternatively, the terminal 10 may establish a SoftAP connection with the printer 200. In the present variant, the SoftAP connection is an example of "second (or third) type of wireless connection".

(Variant 10) The process of T876 of FIG. 9 may not be executed. Then, instead of the process of T919 of FIG. 10, the processes of T872, T874 of FIG. 9 may be executed. In the present variant, "store the first SSID and the first password" may be omitted.

(Variant 11) In the above first embodiment, the terminal 10 sends the CO for printer including the AP information AI2 to the printer 100 (T922 of FIG. 10 or T970 of FIG. 11). Alternatively, the terminal 10 may establish a WFD connection with the printer 100, and send the AP information AI2 to the printer 100 by using this WFD connection. Generally speaking, "third (or fourth) connection information" may not have a format complying with the predetermined rule.

(Variant 12) The processes of T962 to T978 of FIG. 11 may not be executed. Alternatively, in a case of determining that establishment of the DPP connection has failed, the terminal 10 may display, on the display unit 14, a failure screen indicating that the establishment of the DPP connection has failed. In the present variant, "send fourth connection information" may be omitted.

(Variant 13) The process of T966 of FIG. 11 may not be executed. Then, instead of the process of T992 of FIG. 12, the processes of T962, T964 of FIG. 11 may be executed. In the present variant, "store the third SSID and the third password" may be omitted.

(Variant 14) The "Communication device" may not be a printer, and may be another device such as a scanner, a multi-function device, a portable terminal, a PC, and a server.

(Variant 15) In each of the above embodiments, the respective processes of FIG. 2 to 12 are implemented by software (that is, the program 36). Instead of this, one or more of the processes may be implemented by hardware such as a logic circuit.

What is claimed is:

1. A non-transitory computer-readable medium storing computer-readable instructions for a terminal device, wherein the terminal device comprises a Wi-Fi interface configured to execute a wireless communication complying with a Wi-Fi scheme, wherein the computer-readable instructions, when executed by a processor of the terminal device, cause the terminal device to:

in a case where it is determined that a communication device outputs related information which is related to a wireless connection, obtain the related information;

in a case where it is determined that the communication device is a first type of communication device, a Wi-Fi connection is established between the terminal device and a first external device, and the obtained related information is a first type of related information including a public key of the first type of communication device, send an authentication request according to a Device Provisioning Protocol (DPP) of the Wi-Fi scheme, which is obtained by using the first type of related information including the public key, to the first type of communication device via the Wi-Fi interface, the first type of communication device is capable of executing a wireless communication complying with the DPP;

in a case where it is determined that the terminal device receives an authentication response according to the DPP as a response to the authentication request from the first type of communication device via the Wi-Fi interface, send first connection information to the first type of communication device via the Wi-Fi interface, the first connection information is for establishing a first type of wireless connection complying with the DPP between the first type of communication device and the first external device different from the first type of communication device;

in a case where it is determined that the communication device is a second type of communication device and the obtained related information is a second type of related information which is different from the first type of related information, send second connection information to the second type of communication device via the Wi-Fi interface by using the second type of related information without sending the authentication request according to the DPP to the second type of communication device, the second type of communication device is incapable of executing a wireless communication complying with the DPP, and the second connection information is for establishing a second type of wireless connection not complying with the DPP between the second type of communication device and a second external device different from the second type of communication device; and in a case where it is determined that the first type of wireless connection is not established between the first type of communication device and the first external device due to the first external device incapable of executing a wireless communication complying with the DPP after the first connection information has been sent to the first type of communication device, send third connection information to the first type of communication device, the third connection information is for establishing the second type of wireless connection not complying with the DPP between the first type of communication device and the first external device, and the third connection information including a first Service Set Identifier (SSID) identifying a wireless network in which the first external device operates as a parent station and a first password used for the wireless network, wherein, the first connection information is information having a format that complies with the DPP, and the third connection information is information having a format that complies with the DPP which is same as that of the first connection information.

2. The non-transitory computer-readable medium as in claim 1, wherein the computer-readable instructions, when executed by the processor, further cause the terminal device to:

in a case where the related information is obtained, determine whether the obtained related information is the first type of related information or the second type of related information, in a case where it is determined that the obtained related information is the first type of related information, the first connection information is sent to the first type of communication device, and in a case where it is determined that the obtained related information is the second type of related information, the second connection information is sent to the second type of communication device.

3. The non-transitory computer-readable medium as in claim 1, wherein the second type of related information does not include a public key of the second type of communication device.

4. The non-transitory computer-readable medium as in claim 1, wherein the second connection information includes a second Service Set Identifier (SSID) identifying a wireless network in which an access point operates as a parent station and a second password used for the wireless network, and the second external device is the access point.

5. The non-transitory computer-readable medium as in claim 4, wherein the computer-readable instructions, when executed by the processor, further cause the terminal device to:

in the case where the second type of related information is obtained, cause a display unit to display an input screen for inputting at least the second password from among the second SSID and the second password, and the second connection information includes the second password inputted at the input screen.

6. The non-transitory computer-readable medium as in claim 4, wherein the second type of related information includes a third Service Set Identifier (SSID) identifying a wireless network in which the second type of communication device operates as a parent station and a third password used for the wireless network, wherein the computer-readable instructions, when executed by the processor, further cause the terminal device to:

in the case where the second type of related information is obtained, establish a third type of wireless connection which is the wireless connection between the second type of communication device and the terminal device by using the second type of related information including the third SSID and the third password, wherein the second connection information is sent to the second type of communication device by using the third type of wireless connection.

7. The non-transitory computer-readable medium as in claim 4, wherein the computer-readable instructions, when executed by the processor, further cause the terminal device to:

in a case where the second connection information is sent to the second type of communication device, store the second SSID and the second password in a memory; and in a case where the first type of related information is obtained due to the first type of communication device outputting the first type of related information after the second type of wireless connection has been established between the second type of communication device and the access point, send fourth connection information including the second SSID and the second password in the memory to the first type of communication device, the fourth connection information is for establishing the second type of wireless connection not complying with the DPP between the first type of communication device and the access point.

8. The non-transitory computer-readable medium as in claim 7, wherein the fourth connection information is information having a format that complies with the DPP.

9. The non-transitory computer-readable medium as in claim 1, wherein the second type of related information includes a third Service Set Identifier (SSID) identifying a wireless network in which the second type of communication device operates as a parent station and a third password used for the wireless network, the second connection information includes the third SSID and data encrypted by the third password, and the second external device is the terminal device.

10. A terminal device comprising;

a Wi-Fi interface configured to execute a wireless communication complying with a Wi-Fi scheme;

a processor, and a memory storing computer-readable instructions, when executed by the processor, cause the terminal device to:

in a case where it is determined that a communication device outputs related information which is related to a wireless connection, obtain the related information;

in a case where it is determined that the communication device is a first type of communication device, a Wi-Fi connection is established between the terminal device and a first external device, and the obtained related information is a first type of related information including a public key of the first type of communication device, send an authentication request according to a Device Provisioning Protocol (DPP) of the Wi-Fi scheme, which is obtained by using the first type of related information including the public key, to the first type of communication device via the Wi-Fi interface, the first type of communication device is capable of executing a wireless communication complying with the DPP;

in a case where it is determined that the terminal device receives an authentication response according to the DPP as a response to the authentication request from the first type of communication device via the Wi-Fi interface, send first connection information to the first type of communication device via the Wi-Fi interface, the first connection information is for establishing a first type of wireless connection complying with the DPP between the first type of communication device and a first external device different from the first type of communication device;

in a case where the communication device is a second type of communication device and the obtained related information is a second type of related information which is different from the first type of related information, send second connection information to the second type of communication device via the Wi-Fi interface by using the second type of related information without sending the authentication request according to the DPP to the second type of communication device, the second type of communication device is incapable of executing a wireless communication complying with the predetermined rule-DPP, and the second connection information is for establishing a second type of wireless connection not complying with the DPP between the second type of communication device and a second external device different from the second type of communication device; and in a case where the first type of wireless connection is not established between the first type of communication device and the first external device due to the first external device incapable of executing a wireless communication complying with the DPP after the first connection information has been sent to the first type of communication device, send third connection information to the first type of communication device, the third connection information is for establishing the second type of wireless connection not complying with the DPP between the first type of communication device and the first external device, and the third connection information including a first Service Set Identifier (SSID) identifying a wireless network in which the first external device operates as a parent station and a first password used for the wireless network, wherein, the first connection information is information having a format that complies with the DPP, and the third connection information is information having a format that complies with the predetermined rule-DPP.

11. The non-transitory computer-readable medium as in claim 1, wherein the first type of communication device is at least one of printer or a scanner supporting the DPP, the second type of communication device is at least one of a printer or a scanner not supporting the DPP, and each of the first external device and the second external device is an access point.

* * * * *